(12) United States Patent
Sutherland

(10) Patent No.: US 10,162,112 B2
(45) Date of Patent: Dec. 25, 2018

(54) OPTICAL WIRE BOND APPARATUS AND METHODS EMPLOYING LASER-WRITTEN WAVEGUIDES

(71) Applicant: Corning Optical Communications LLC, Hickory, NC (US)

(72) Inventor: James Scott Sutherland, Corning, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/168,383

(22) Filed: May 31, 2016

(65) Prior Publication Data

US 2017/0343733 A1 Nov. 30, 2017

(51) Int. Cl.
*G02B 6/125* (2006.01)
*G02B 6/13* (2006.01)
(Continued)

(52) U.S. Cl.
CPC .............. *G02B 6/125* (2013.01); *G02B 6/13* (2013.01); *G02B 6/3608* (2013.01); *G02B 2006/12147* (2013.01)

(58) Field of Classification Search
None
See application file for complete search history.

(56) References Cited

U.S. PATENT DOCUMENTS 6,330,377 B1 * 12/2001 Kosemura ................ G02B 6/42
385/14
6,477,286 B1 * 11/2002 Ouchi ....................... G02B 6/10
257/433

(Continued)

FOREIGN PATENT DOCUMENTS

CN          102116898 A    7/2011
JP          2004046031 A   2/2004
(Continued)

OTHER PUBLICATIONS

U.S. Appl. No. 14/946,977, filed Nov. 20, 2015, "Optical Interface Devices and Methods Employing Optical Fibers and a Support Member Having a Bend Section," D. Butler, W. Denson, J. Sutherland.

(Continued)

*Primary Examiner* — Chad H Smith
(74) *Attorney, Agent, or Firm* — Robert L. Branham

(57) ABSTRACT

An optical wire bond apparatus for optically connecting an optical-electrical integrated circuit (OE-IC) to an optical-electrical printed circuit board (OE-PCB) is formed by laser writing cores in a flexible glass support member to define an array of optical waveguides. The support member has a bend section and the waveguides reside close to either a top or bottom surface of the support member at the bend section. The cores have a front-end portion that can be laser written after the front end of the support member is coarse-aligned to optical waveguide structures in the OE-PCB to obtain fine alignment. The support members can be formed from flexible glass sheets or by drawing a glass preform. A photonic assembly that includes the OE-IC and the OE-PCB optically connected using the optical wire bond apparatus is also disclosed.

13 Claims, 16 Drawing Sheets

(51) Int. Cl.
*G02B 6/36* (2006.01)
*G02B 6/12* (2006.01)

(56) References Cited

U.S. PATENT DOCUMENTS

| | | | |
|---|---|---|---|
| 6,573,026 | B1 | 6/2003 | Aitken et al. |
| 6,690,867 | B2* | 2/2004 | Melton ............... G02B 6/3608 385/114 |
| 6,977,137 | B2 | 12/2005 | Borrelli et al. |
| 7,329,050 | B1 | 2/2008 | Dugan et al. |
| 8,270,784 | B2 | 9/2012 | Thomson et al. |
| 9,034,222 | B2 | 5/2015 | Koos et al. |
| 2003/0099452 | A1 | 5/2003 | Borrelli et al. |
| 2004/0258359 | A1 | 12/2004 | Corkum et al. |
| 2009/0310906 | A1 | 12/2009 | Miyatake |
| 2015/0168646 | A1* | 6/2015 | Arai ..................... G02B 6/122 385/14 |

FOREIGN PATENT DOCUMENTS

| | | | |
|---|---|---|---|
| JP | 2005010373 A | 1/2005 |
| JP | 03649835 B2 | 5/2005 |
| JP | 2005156945 A | 6/2005 |
| JP | 2006201014 A | 8/2006 |
| JP | 03925209 B2 | 6/2007 |
| JP | 04514999 B2 | 7/2010 |
| WO | 2012150568 A1 | 11/2012 |

OTHER PUBLICATIONS

U.S. Appl. No. 14/861,429, filed Sep. 22, 2015, "An Optical Interface Device Having a Curved Waveguide Using Laser Writing and Methods of Forming," J. Sutherland.

K. P. Jackson, et al., "A high-density, four-channel, OEIC transceiver module utilizing planar-processed optical waveguides and flip-chip, solder-bump technology," Journal of Lightwave Technology, vol. 12, No. 7, Jul. 1994, pp. 1185-1191.

Cheng, K.W., et al., "Dye-doped polymer based self-written waveguide for optical interconnection," Portable Information Devices, 2008 and the 2008 7th IEEE Conference on Polymers and Adhesives in Microelectronics and Photonics. Portable-Polytronic 2008. 2nd IEEE International Interdisciplinary Conference on, pp. 1-6, 2008.

D. Dai, Daoxin and Y. Shi, "Deeply Etched SiO2 Ridge Waveguide for Sharp Bends," Journal of Lightwave Technology, vol. 24, Issue.12, pp. 5019-5024.

Hirose, N., et al., "Optical component coupling using self-written waveguides," Optical Communication, 2001. ECOC '01. 27th European Conference on, vol. 2, pp. 140-141, 2001.

Koos, C, et al, "Photonic wire bonding: Nanophotonic interconnects fabricated by direct-write 3D lithography," Transparent Optical Networks (ICTON), 2013 15th International Conference on, pp. 1-4, 2013.

Kung-Li, D., et al., "Self-Aligned Single-Mode Polymer Waveguide Interconnections for Efficient Chip-to-Chip Optical Coupling," IEEE Journal of Selected Topics in Quantum Electronics, vol. 12, Issue 5, pp. 923-930, 2006.

L. Brusberg, et al., "Thin Glass Based Packaging Technologies for Optoelectronic Modules," Proceedings of 2009 Electronic Components and Technology Conference, pp. 207-212, 2009.

Lindenmann, N., et al,. "Connecting silicon photonic circuits to multicore fibers by photonic wire bonding," Lightwave Technology, Journal of, vol. 33, Issue 4, pp. 755-760, 2015.

Lindenmann, N., et. Al, "Photonic wire bonding for single-mode chip-to-chip interconnects," Group IV Photonics (GFP), 2011 8th IEEE International Conference on pp. 380-382, 2011.

Myung-Joon, K., et al., "180° Light Path Conversion Device With Tapered Self-Written Waveguide for Optical Interconnection," Photonics Technology Letters, IEEE, vol. 22, Issue 15, pp. 1126-1128, 2010.

Ozawa, H., et al., "Self-written waveguide connection between VCSEL and optical fiber with 45/spl deg/ mirror using Green laser," Photonics Technology Letters, IEEE, vol. 18, Issue 3, pp. 532-534, 2005.

S. Akiyama, et al., "Air trench bends and splitters for dense optical integration in low index contrast," Journal of Lightwave Technology, vol. 23 , Issue: 7, pp. 2271-2277, 2005.

S. Eaton., et al., "Heat accumulation effects in femtosecond laser-written waveguides with variable repetition rate," Optics Express, 13(12), 4708-4716, 2005.

S. Hiramatsu, et al., "Laser-written optical-path redirected waveguide device for optical back-plane interconnects," Photonics Technology Letters, IEEE, vol. 16 , Issue: 9, pp. 2075-2077, 2004.

S. Huang, et al.,"Ultrafast Laser Fabrication of 3D Photonic Components in Flexible Glasses," Optical Fiber Communications Conference and Exhibition (OFC), pp. 1-3, 2014.

Streltsov, et al., "Laser-written high-contrast waveguides in glass," Proceedings of the SPIE, vol. 7366, id. 736611, 2009.

Sugihara, O., et al., "Light-induced self-written polymeric optical waveguides for single-mode propagation and for optical interconnections," Photonics Technology Letters, IEEE, vol. 16, Issue 3, pp. 804-806, 2004.

Van Thourhout, D., et al., "Technologies for on-chip optical interconnects," Lasers and Electra-Optics Society, 2005. LEOS 2005. The 18th Annual Meeting of the IEEE, pp. 204-205, 2005.

Yagisawa, T., et al., "Novel trace design for high data-rate multi-channel optical transceiver assembled using flip-chip bonding," Electronic Components and Technology Conference (ECTC), 2014 IEEE 64th, pp. 1048-1053, 2014.

Yoshimura, T., et al., "Self-organized lightwave network based on waveguide films for three-dimensional optical wiring within boxes," Lightwave Technology, Journal of, vol. 22.

* cited by examiner

OPTICAL WIRE BOND APPARATUS AND METHODS EMPLOYING LASER-WRITTEN WAVEGUIDES

FIELD

The present disclosure relates to interconnections made between a semiconductor integrated circuit chip and a printed circuit board, and in particular relates to optical wire bond apparatus and methods that employ laser-written waveguides for forming optical interconnections in between an optical-electrical integrated circuit chip and an optical-electrical printed circuit board.

The entire disclosure of any publication or patent document mentioned herein is incorporated by reference.

BACKGROUND

Semiconductor integrated circuits (ICs) are typically mounted in or on a printed circuit board (PCB) as part of a packing process. For electrical ICs, in one approach individual metal wires are used to make electrical connections between first metal pads on the IC and second metal pads on the PCB as part of a process referred to in the art as "wire bonding."

The need for high-bandwidth communication with electrical ICs has prompted the addition of optical waveguide connections between optical+electrical ICs ("OE-ICs") and OE-PCBs that have both optical and electrical functionality and optical and electrical connection locations. Like the wire bonding of electrical ICs, optical wire bonding along with the electrical wire bonding is performed between OE-ICs and OE-PCBs. The optical wire bonding can be carried out for example using flyover optical fibers routed above the OE-PCB surface. In this case, the OE-IC packing must incorporate optical connector hardware (e.g., precision fiber connector alignment features, such as alignment pins and holes) to support pluggable optical jumper cables. This increases the packaging cost and complexity of the OE-ICs.

More recently, ball grid arrays of solder balls are being used to form electrical connections between electronic PCBs and electronic ICs in a "flip chip" configuration. Unfortunately, there is no viable optical equivalent of the ball grid array for use with OE-PCBs and OE-ICs. Other approaches for making the optical interconnections in a flip chip configuration include using individual optical fibers or micro-optics to define free-space optical paths. Unfortunately, these approaches suffer from serious alignment issues that make them relatively low yield and difficult to implement.

SUMMARY

A first aspect of the disclosure is a method of optically interconnecting an OE-IC that operably supports at least one photonic device and an OE-PCB that operably supports at least one optical waveguide structure. The method includes: a) laser writing at least one optical waveguide having front and back ends in a flexible glass support member that has a bend section, a top surface, a bottom surface, a front end having a front-end support element and a back end having a back-end support element; b) arranging the flexible glass support member so that the front end of the at least one optical waveguide is adjacent and in optical communication with the at least one optical waveguide structure of the OE-PCB and the back end of the at least one optical waveguide is adjacent and in optical communication with the at least one photonic device of the OE-IC; and c) attaching the front end of the flexible glass support structure to the OE-PCB and attaching the back end of the flexible glass support structure to the OE-IC.

Another aspect of the disclosure is a photonic assembly that includes: an OE-IC that operably supports at least one photonic device; an OE-PCB that operably supports at least one waveguide structure; an optical wire bond apparatus that includes a flexible glass support member having a body, a top surface, a bottom surface, a front end that includes a front-end support element, a back end that includes a back-end support element, and a bend section between the front and back ends, the flexible glass support member operably supporting at least one optical waveguide defined in the body and that extends from the back to the front end; and the optical wire bond apparatus being arranged with the front end of the at least one optical waveguide adjacent and in optical communication with the at least one waveguide structure of the OE-PCB and the back end of the at least one optical waveguide adjacent and in optical communication with the at least one photonic device of the OE-IC.

Another aspect of the disclosure is an optical wire bond apparatus for optically interconnecting an OE-IC that operably supports at least one photonic device and an OE-PCB that operably supports at least one optical waveguide structure. The optical wire bond apparatus includes: a flexible support member having a body made of glass with a refractive index $n_b$, a top surface, a bottom surface, a front end, a back end, and a bend section between the front and back ends that defines a suitable height such as in the range from 2 millimeter to 4 millimeter; a front-end support element that resides adjacent the front end of the support member; a back-end support element that resides adjacent the back end of the support member; and at least one core formed within the body of the flexible glass support member and that extends from the back to the front end and that resides within 10 microns of either the top surface or bottom surface of the support member, the at least one core having a refractive index $n_c > n_b$ and defining at least one waveguide.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

In the discussion below, the term "micron" means micrometer, i.e., $1\times10^{-6}$ meter, which is abbreviated as "μm" in the art.

Optical Wire Bond Apparatus and Methods Using Support Member

Figure 1:
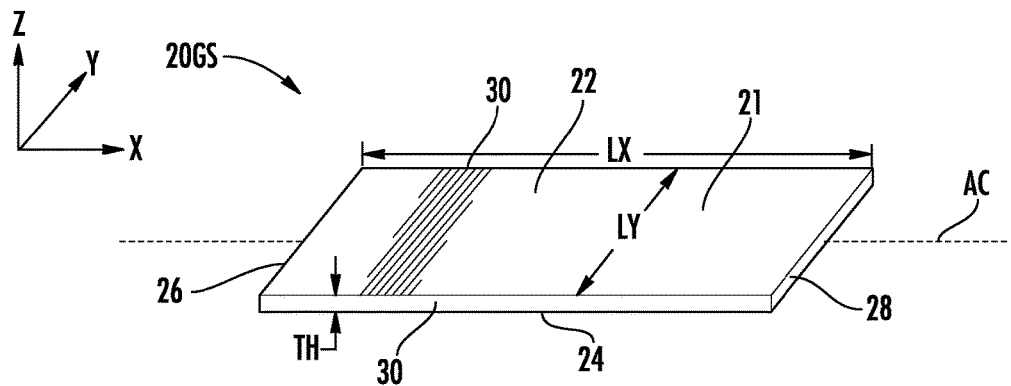
FIG. 1 is an elevated view of an example glass sheet that is processed to define a support member for use in forming an optical wire bond apparatus.

An aspect of the disclosure is directed to an optical wire bond apparatus, including methods of forming the optical wire bond apparatus. An example optical wire bond apparatus as disclosed herein includes as flexible glass support member 20 formed from a glass sheet 20GS such as shown in the elevated view of FIG. 1. The glass sheet 20GS (and thus the subsequently formed flexible glass support member 20) has a body 21 with a refractive index $n_b$, a top surface 22, a bottom surface 24, a front end 26, a back end 28 and opposite sides 30. The glass sheet 20GS also has a thickness TH, and dimensions LX and LY in the x-direction and y-direction, respectively. In an example, the thickness TH is between 50 microns and 100 microns. The dimensions LX and LY represent the "length" and the "width" of the support member. The glass sheet 20GS includes a central axis AC that runs in the x-direction.

Example glass materials for glass sheet 20GS include a flexible glass, such as Corning's WILLOW® glass, or a borosilicate glasses such as Pyrex™. Other chemically strengthened, flexible glasses can also be used. An advantage of using glass to form the optical wire bond apparatus is that it provides a substantial match to the coefficient of thermal expansions (CTEs) of OE-ICs and OE-PCBs, as discussed below.

Figure 2A:
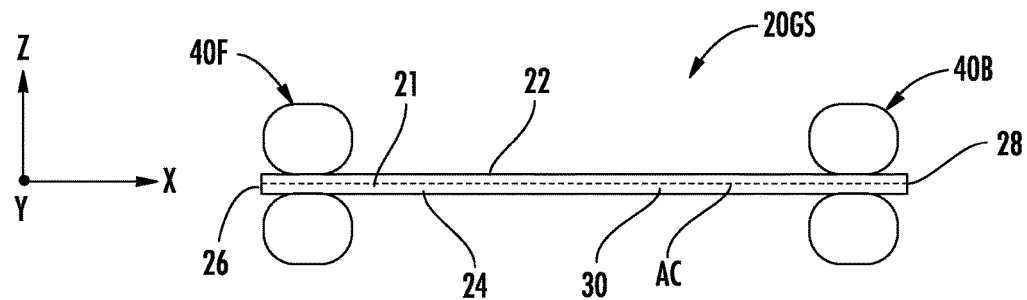
FIG. 2A is a side view of the glass sheet of FIG. 1 being held near the front and back ends by front-end and back-end gripping members, respectively.
Figure 2B:
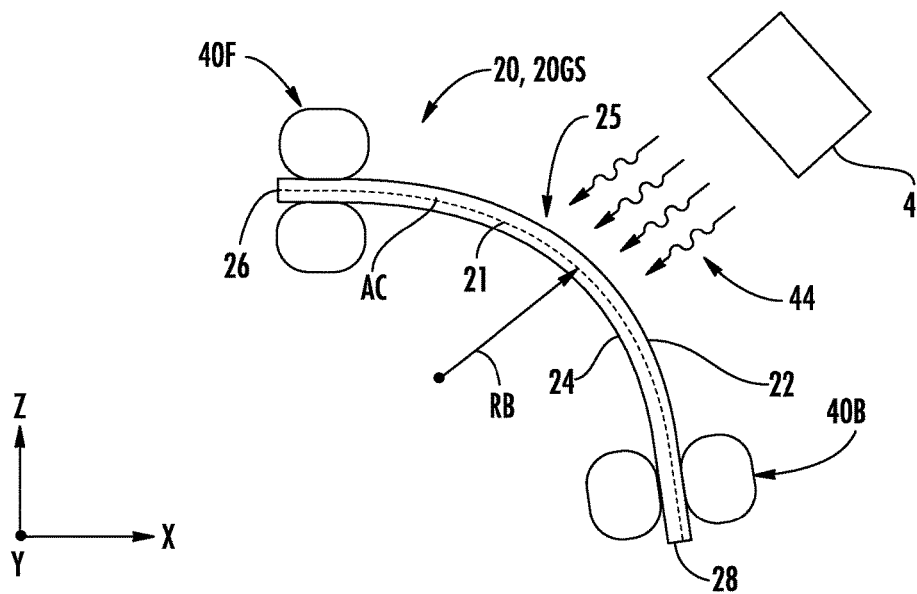
FIG. 2B is similar to FIG. 2A and shows heat being applied to the glass sheet to soften the glass sheet so that it can be bent to form a permanent bend section.

FIG. 2A is a side view of glass sheet 20GS being held near the front and back ends 26 and 28 by front-end and back-end gripping members 40F and 40B, respectively. FIG. 2B is similar to FIG. 2A and shows heat 44 being applied to glass sheet 20GS at top surface 22 of support member 20 to soften the glass material. In an example, heat 44 is supplied by a heat source 46, which in an example can include a $CO_2$ laser, an array of infrared laser diodes, etc. The heat 44 softens the glass material of glass sheet 20GS while the gripping members 40F and 40B are used to apply a controlled bending force to shape the glass sheet. The controlled bending force forms in the glass sheet 20GS a bend section 25 having a select bending, e.g., a generally rounded bend defined by a bend radius RB measured to the central axis AC. The heated glass sheet 20GS is allowed to cool, at which point the bend section 25 is established (i.e., becomes permanent or fixed) to define the aforementioned flexible glass support member ("support member") 20.

The location where heat 44 is applied to glass sheet 20GS when forming support member 20 can be varied to adjust where bend section 25 is formed, as well as to adjust the shape of the bend section. In addition, the spatial distribution of heat 44 (i.e., the heating profile) can be configured to control the shape of bend section 25. For example, variations in the intensity of heat 44 along glass sheet 20GS can be used to produce a non-uniform bending, i.e., more complex bending than a simple rounded bend.

In other examples, glass sheet 20GS can be shaped to form support member 20 using traditional glass-forming processes and glass-shaping processes, such as hot pressing or vacuum forming over a mandrel.

As discussed in greater below, support member 20 supports one or more optical waveguides 100. A bend section 25 having a varying bend radius RB may be advantageous for minimizing insertion loss between straight and curved portions of the waveguide. The guided mode that travels in a bent waveguide is generally shifted toward the outside of the bend. When light couples from a straight-waveguide guided mode to a curved-waveguide guided mode, the lateral shift in the mode fields introduces optical loss. An abrupt transition from a straight waveguide section to a curved waveguide section can be avoided by gradually changing the bend radius RB of bend section 25. This may be accomplished by using heat 44 to create a non-uniform temperature distribution across the glass sheet 20GS prior to bending. Regions of the support member 20 that are hotter will deform more under applied bending force than regions that are cooler. As a result, bend section 25 with gradually varying (i.e., non-constant) bend radius RB may be formed, as opposed to a bend section defined by a single, constant radius of curvature. Such a bend section 25 can be configured so that the transition from the straight to curved sections of a given waveguide 100 is substantially adiabatic.

Figure 3A:
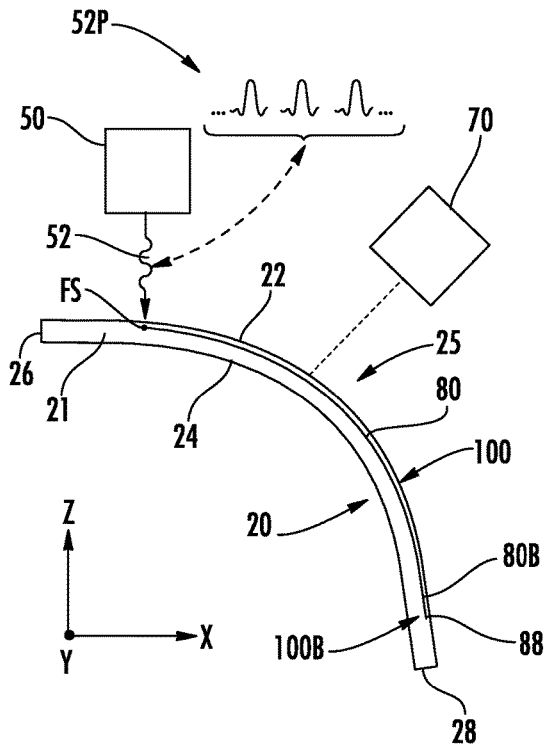
FIG. 3A is a cross-sectional view of the support member formed from the glass sheet, with the support member having the bend section and being operably arranged relative to a laser system that emits a laser beam to perform laser writing of a core within the body of the support member to form a waveguide.

The result of the above-described bending process is a support member 20 that includes permanent or fixed bend section 25, with central axis AC now being curved and running through the middle of body 21 between the front and back ends 26 and 28. While the bend section 25 is permanent, support member 20 remains flexible Once support member 20 with bend section 25 is formed, the next step in the method includes forming at least one optical waveguide in the support member. FIG. 3A is a cross-sectional view of the support member 20 operably arranged relative to a laser system 50 that emits a laser beam 52. In an example, laser beam 52 is made up of femtosecond light pulses 52P, as shown in the close-up inset. In an example, laser system 50 is configured so that laser beam 52 can be scanned relative to support member 20. The laser system 50 can also be figured to bring laser beam 52 to a focus to form a focus spot FS. The focus spot FS can have a select size, e.g., a diameter.

An optical profilometer 70 is shown in FIG. 3A and can be used to characterize the curvature of bend section 25 at top surface 22 as well as bottom surface 24 of support member 20. The curvature information of support member 20 obtained by optical profilometer 70 can be used to scan laser beam 52 relative to support member 20 so that the focus spot FS traces a select path within body 21. The scanning operation forms ("writes") a high-index region or "core" over the select path within body 21. In an example, a low-index medium 33 resides immediately adjacent upper surface 22 and lower surface 24. In an example, low-index medium 33 has a refractive index $n_m$, which in an example is assumed to be that of air and is approximated by $n_m \sim 1$. In other examples, the low-index medium can be a thin layer of low-index material, i.e., $n_m < n_b$.

In an example, at least a portion of core 80 resides adjacent top surface 22 or bottom surface 24. The core 80 so formed has a refractive index $n_c > n_b$. The core 80 has a front-end portion 80F that includes a front end 86 that resides at or adjacent front end 26 of support member 20 (see FIGS. 3C, 3D) and a back-end portion 80B that includes a back end 88 that resides at or adjacent back end 28 of the support member. In an example, core 80 resides within 10 microns of either the top surface or the bottom surface at the bend section 25. A given core 80 generally resides in an x-z plane, though the core can also have γ-component at one or more locations. In an example involving multiple cores 80, the multiple cores can be substantially parallel to one another.

The core 80, the surrounding body 21 and the adjacent low-index medium 33 define an optical waveguide ("waveguide") 100. The waveguide 100 has a front-end portion 100F and a back-end portion 100B (see FIGS. 3C, 3D) defined by the front-end and back-end core portions 80F and 80B. Also in an example, multiple cores 80 are formed that define multiple waveguides 100. The multiple waveguides can define one or more waveguide arrays, as introduced and discussed below.

The laser writing of optical waveguides in bulk glass is known in the art and is described in, for example, U.S. Pat. Nos. 6,573,026 and 6,977,137, which are incorporated by reference herein. In an example, a refractive index difference $\delta = n_c - n_b$ is between 0.01 and 0.02 (i.e., between 1% and 2%). In another example, $\delta < 0.01$. The refractive index difference $\delta$ can also be made to vary along the length of core 80, e.g., by changing the intensity of laser beam 52. The specific wavelength, pulse duration (i.e., pulse width) and pulse energy of laser beam 52 needed to form core 80 depends on the particular glass used for support member 20. As noted above, in an example multiple cores 80 and thus multiple waveguides 100 are formed in body 21 of support member 20.

While core 80 is shown in FIG. 3A and in other Figures as having a sharp boundary, this is for ease of illustration. In practice, refractive index $n_c$ of core 80 can vary laterally, i.e., can have a graded index, in which case the "edge" of the core is not well-defined. In such a case, an effective edge for core 10 can be denoted using any one of a number of criteria, such as the 1/e or 1/e² point of the change in refractive index $n_c$ relative to its on-axis value.

The core 80 can also be formed using other techniques, such as an ion-exchange process. The ion-exchange process can include employing a masking process on top surface 22 to define the one or more cores 80. The masking process can include standard lithographic masking techniques, including laser exposure to define the mask pattern. The present disclosure emphasizes laser writing of one or more cores 80 in view of the ability of laser writing to quickly and precisely form well-defined cores and thus well-defined waveguides 100 within body 21 of support member 20.

Figure 3B:
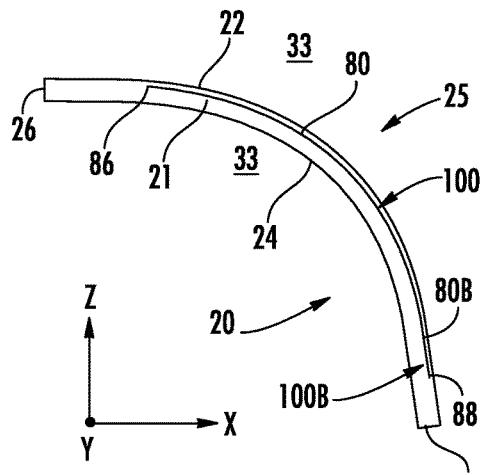
FIG. 3B is the resulting support member of the process of FIG. 4A with a core formed therein, and illustrating an example wherein the core does not extend all the way to the front end and to the back end of the support member.

FIG. 3B is similar to FIG. 3A and shows an example of the resulting processed support member 20, wherein core 80 does not extend to the front and back ends 26 and 28 of the support member. Such a configuration allows for further processing of the front and back ends 26 and 28 of the support member later on. For example, the back end 28 of support member 20 may be cut or polished so that core back end 88 resides at the back end 28 of support member 20.

Figure 3C:
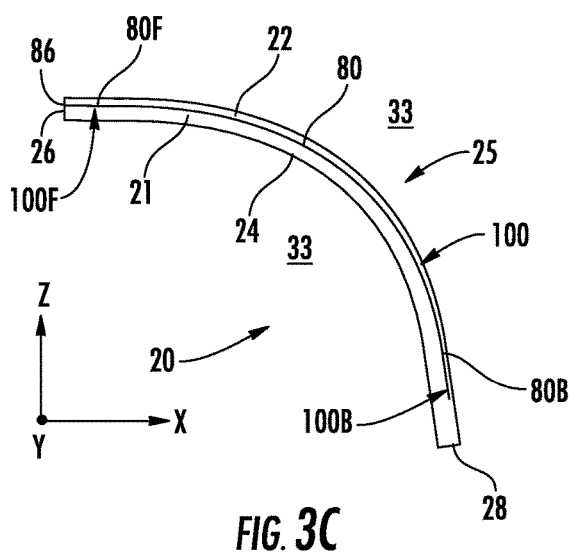
FIG. 3C is similar to FIG. 3B and shows an example where the core includes a front-end core portion that extends to the front end of the support member.

FIG. 3C is similar to FIG. 3B and shows an example where core 80 extends all the way to front end 26 (i.e., core front end 86 resides at front end 26) either by a single core-forming process, or a subsequent core-forming process, i.e., an additional laser-writing step. An advantage of adding front-end core portion 80F to an existing core 80 is that is allows for tailoring the location of core front end ends 86, e.g., to correspond to the location of components of an OE-IC and/or an OC-PCB. It may be, for example, that the location of the components of an OE-IC and/or an OC-PCB to be optically connected by the optical wire bond apparatus presently under construction may not be known at the time cores 80 need to be formed.

Figure 3D:
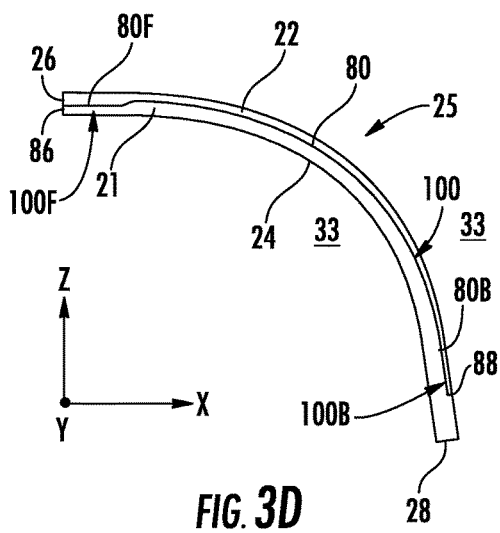
FIG. 3D is similar to FIG. 3C and shows an example of where the front-end core portion transitions from the being near the top surface of the support member to close to the middle at the front end of the support member.

FIG. 3D is similar to FIG. 3B and illustrates an example where front-end portion 80F of core 80 has been added to an existing core. The added front-end core portion 80F transitions from being closer to the top surface 22 of support member 20 to having the core front end 86 reside being closer to central axis AC the front end 26 of the support member. In another example, the core 80 of FIG. 3D can be formed in a single laser writing operation.

Figure 4A:
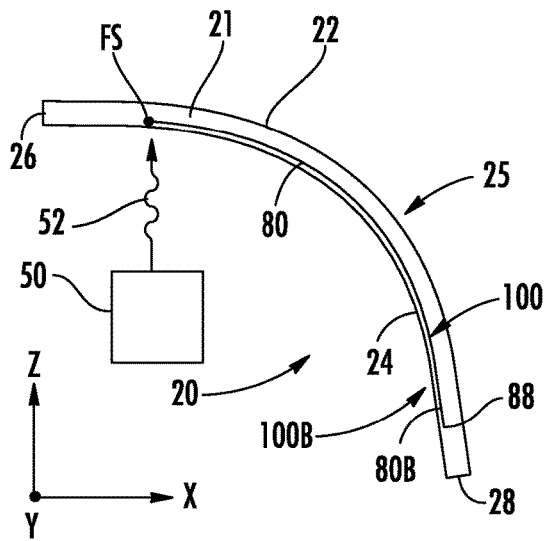
FIGS. 4A through 4D are cross-sectional views of example support members illustrating different example configurations for the cores and waveguides formed therein.
Figure 4B:
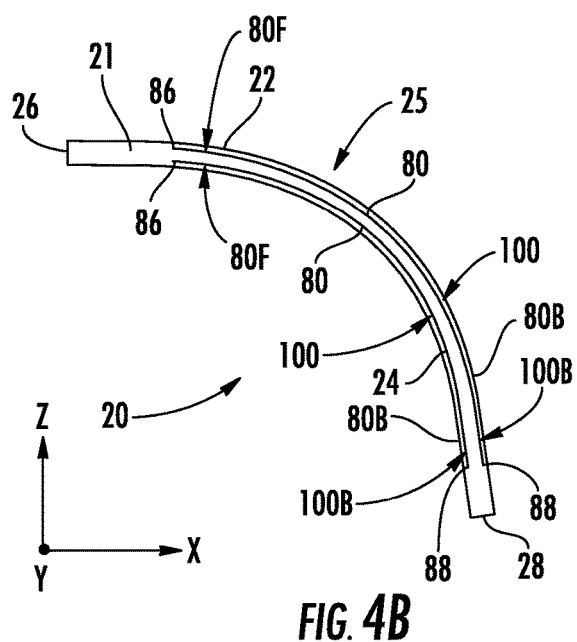
Figure 4C:
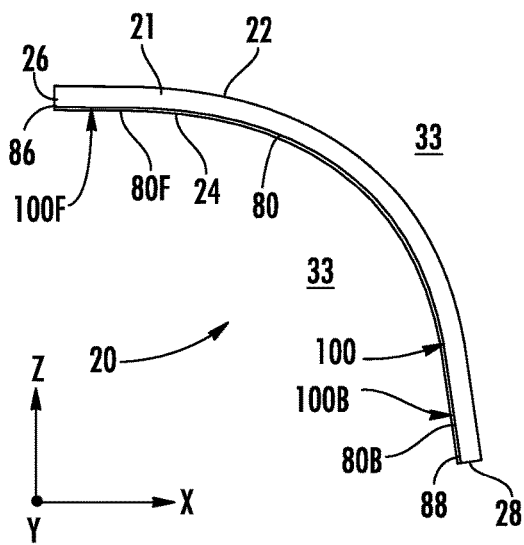
Figure 4D:
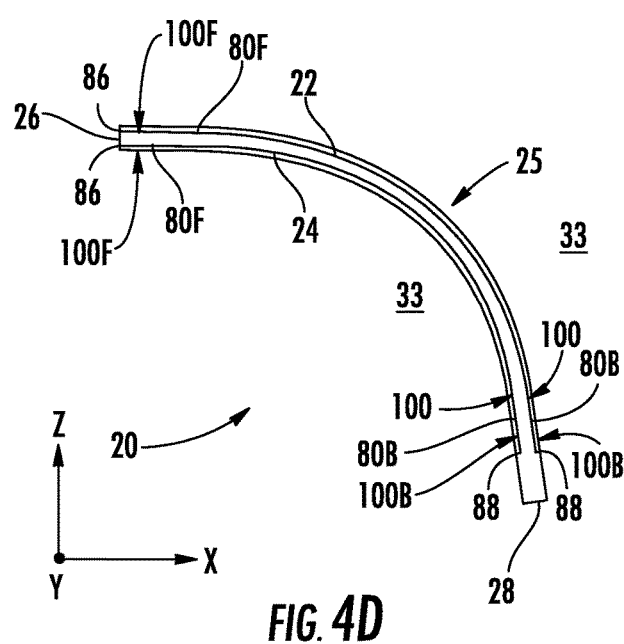

FIG. 4A is similar to FIG. 3B and illustrates an example where core 80 is formed closer to bottom surface 24 of support member 20. FIG. 4B is similar to FIG. 4A and shows two substantially parallel cores 80, one formed closer to the top surface 22 and one formed closer to the bottom surface 24. FIGS. 4C and 4D are similar to FIGS. 4A and 4B respectively show the front-end core portions 80F extending all the way to front end 26 of support member 20 so that core front end 86 resides at the front end of support member 20.

In an example, multiple cores 80 can be arranged in a 1D configuration at bend section 25 and transition within body 21 of support member 20 to define a 2D core configuration at one or both of the front-end and back-end core portions 80F and 80B at the front and back ends 26 and 28, respectively. The 1D configuration can be relatively close to either top surface 22 or bottom surface 24 to take advantage of the strong optical when cores 80 are proximate the low-index medium adjacent the top or bottom surfaces 22 and 24 at bend section 25. The 2D configuration of cores 80 at front end 26 of support member 20 can include for example two rows of core front-end sections 80F of cores 80, with the two rows residing at different z coordinates (i.e., one row above the other)

The cores 80 can also be arranged so that their (y-direction) pitch is non-constant, i.e., is different at different positions between front end 26 and back end 28 of support member 20. For example, cores 80 can be configured to have a first pitch at front end 26 of support member 20 and a second pitch at back end 28 of the support member. The cores 80 can also have a third pitch at bend 25. It is noted that the formation of the one or more cores 80 formed in body 21 of support member 20 can be done at any stage of method, including when support member 20 is still flat.

The cores 80 can also be configured to have different widths at different positions between front end 26 and back end 28 of support member 20. Such a configuration can be used to enable low-loss coupling to active or passive optical devices with mode fields that are extremely small (e.g., planar Si waveguides) or extremely large (e.g., collimated beams). In an example, the change in core size can be made adiabatic to minimize optical losses. The shape of cores 80 can also be tailored, e.g., to be other than round, e.g., oval or otherwise elongate if needed.

Figure 5A:
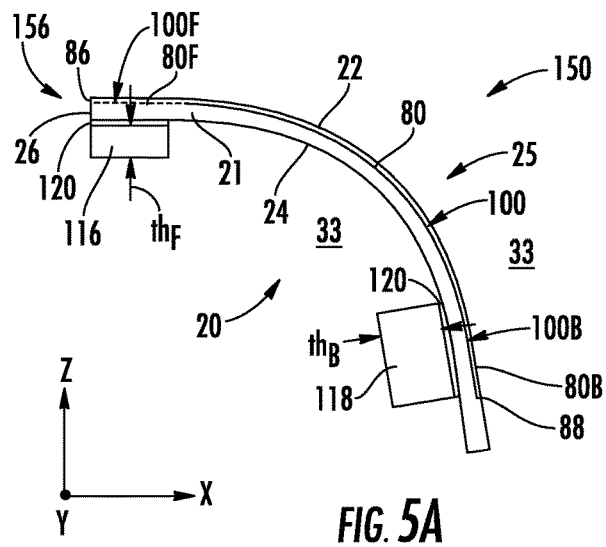
FIG. 5A is a cross-sectional view of an optical wire bond apparatus in the process of being fabricated and that includes a support member with a core formed therein and that defines a corresponding waveguide, and wherein the front and back ends of the support member respectively include includes front-end and back-end support elements.

FIG. 5A is a cross-sectional view of an optical wire bond apparatus 150 in the process of being fabricated and that includes the example support member 20 of FIG. 4B, which includes core 80 and the corresponding waveguide 100. As noted above, more than one core 80 and more than one waveguide 100 can be formed, and single-core/single-waveguide embodiment is shown herein and referred to below for ease of discussion. The optical wire bond apparatus 150 has front and back ends 156 and 158 that respectively include the front and back ends 26 and 28 of support member 20. The front end core portion 80F and corresponding front-end portion 100F of waveguide 100 is shown as a dashed line since these features will be added later on in the process, though they could also have been added earlier in the process, e.g., if it is anticipated that the alignment of waveguides 100 to OE-PCB waveguide structures 400 (introduced and discussed below) will be carried out using traditional active alignment techniques.

The optical wire bond apparatus 150 of FIG. 5A includes front-end and back-end support elements 116 and 118 attached to support member 20 at the bottom surface 24 adjacent front end 26 and back end 28, respectively. In an example, the front-end and back-end support elements 116 and 118 are attached to the bottom surface 24 using an adhesive 120, e.g., a light-activated adhesive such as a ultraviolet (UV)-curable adhesive. In an example, the front-end and back-end support elements 116 and 118 are made of glass or another UV-transparent material, and further in an example can be made of the same glass material as the support member 20. One purpose of the front-end and back-end support elements 116 and 118 is to provide mechanical support when using optical wire bond apparatus 150 as an optical interface device to optically connect the OE-IC and the OE-PCB, as explained in greater detail below. The front-end and back-end support elements 116 and 118 have respective thicknesses $th_F$ and $th_B$, which in an example can be between 1.5 mm and 2.5 mm.

Figure 5B:
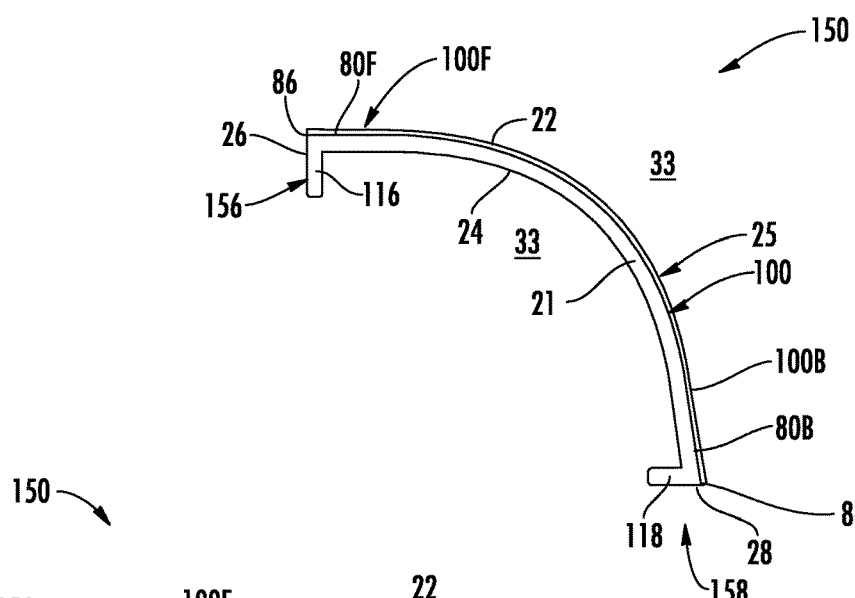
FIG. 5B is similar to FIG. 5A and illustrates an embodiment wherein the front and back support elements have an L-shape.

FIG. 5B is similar to FIG. 5A and illustrates an example wherein the front-end and back-end support elements 116 and 118 are formed as an integral part of body 21 of support member 20. This can be accomplished in one example by locally heating the front and back ends 26 and 28 of the support member and then bending the front and back ends around a tight right-angle bend to form L-shaped front-end and back-end support elements 116 and 118 as shown. The L-shaped front-end and back-end support elements 116 and 118 increase the size (surface area) of the front and back ends 26 and 28, which increases the bonding area when the optical wire bond apparatus 150 is used to optically connect an OE-IC and OE-PCB.

The radii of curvature at the outside corner of the L-shaped front-end and back-end support elements 116 and 118 of FIG. 5B may be sufficiently small so that removing a small portion of the L-shape via polishing yields sharp outside corner. This creates a flat outside bend surface that extends from the front-end L-shaped support element 116 to the back-end L-shaped support element 118. This in turn enables laser writing of at least one core 80 up to the L-shaped support elements 116 and 118 where they join with other components. The inside of the L-shaped support elements 116 and 118 can be reinforced (e.g., with an adhesive) if added strength is required.

Figure 5C:
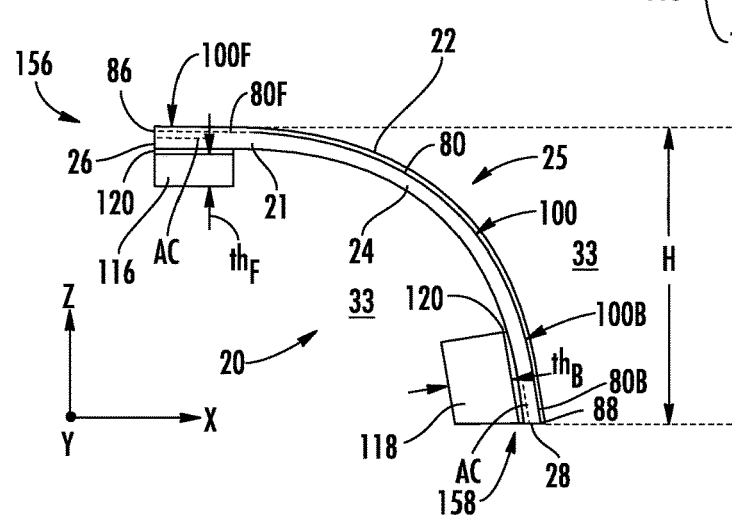
FIG. 5C is similar to FIG. 5A and illustrates an example where the front and back ends of the optical wire bond apparatus are polished to create planar front and back ends.

FIG. 5C is similar to FIG. 5A and illustrates the next step in the fabrication process wherein the front end 26 of support member 20 and the front-end support element 116 are polished to create a planar front end 156 of optical wire bond apparatus 150. Likewise, back end 28 of support member 20 and the back-end support element 118 are polished to create a planar back end 158 of optical wire bond apparatus 150. The polished and planar front and back ends 156 and 158 may be perpendicular to central axis AC, or angled with respect thereto, for example at about 8°, to minimize back reflections. The optical wire bond apparatus 150 has a height H measured from the back end 158 to the top surface 22 of support member 20 at front end 156 as shown in FIG. 5C. In an example, the height H is in the range from 2 mm to 4 mm.

Figure 6A:
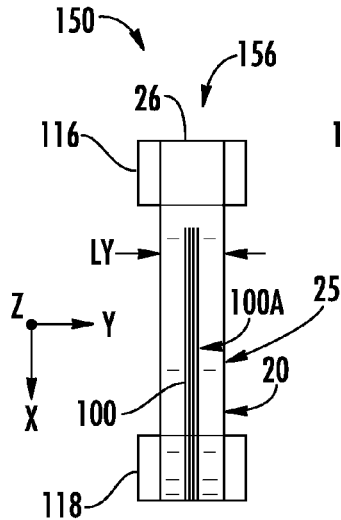
FIGS. 6A through 6D are top-down views (−z-direction) of different example configurations for the optical wire bond apparatus.

The curved shape of support member 20 allows it to flex when one of the front-end and back-end support members 116 and 118 is laterally displaced while the other is held in place. The curved shape is also designed to allow moderate twisting about its x-axis as well as flexing in the x-z plane. FIGS. 6A through 6D are top-down views (-z-direction) different example configurations for optical wire body apparatus 150. FIG. 6A shows an example where the support member 20 has a width LY that supports an array 100A of multiple waveguides 100 with room to spare in the lateral direction. The support member 20 width LY is selected so that under lateral displacement of the support member deflects a moderate force substantially below the shear limits of the used to join the ends 156 and 158 of optical wire bond apparatus 150 to neighboring components, as described below.

Figure 6B:
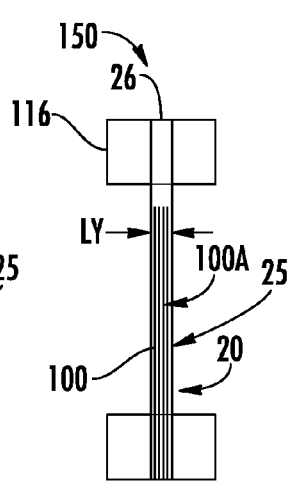
Figure 6C:
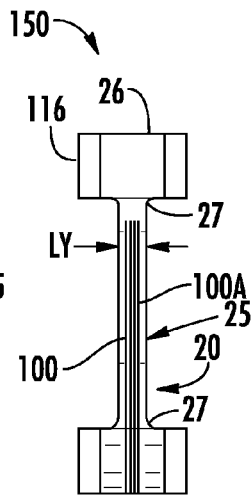

FIG. 6B shows an example where width LY of support member 20 is narrower than the example of FIG. 6A and accommodates an array 100A of multiple waveguides 100 but with little or no room to spare in the lateral direction. FIG. 6C is similar to FIG. 6B and illustrates an example wherein support member 20 is cut into an "I" shaped sheet with filleted corners 27 for improved strength under lateral displacement or twisting, The filleted corners 27 can be formed by laser processing.

Figure 6D:
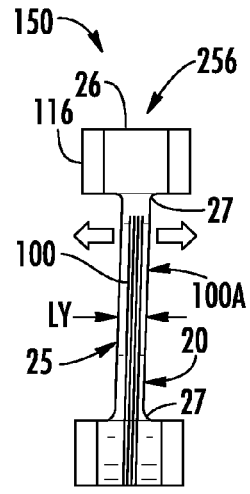

Using either of the configurations of optical wire bond apparatus 150 of FIGS. 6A through 6C, support member 20 can be easily deflected laterally (i.e., in the y-direction), as shown in FIG. 6D. This flexibility is important both during assembly and in long term use. During assembly the active alignment processes introduces relative motion of the two ends of the support member that could introduce unwanted adhesive joint strains if not accommodated for by the flexibility of the support member 20. In long term use, the front and back ends 26 and 28 of the support member 20 can shift due to motion caused by a material CTE mismatch under environmental temperature swings.

Figure 7:
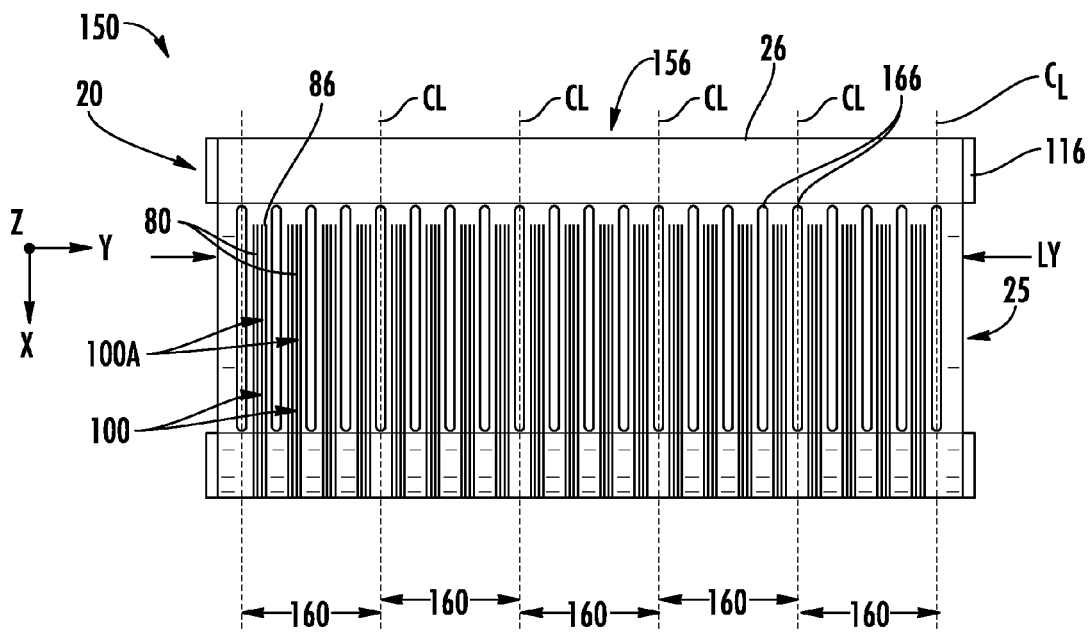
FIG. 7 is a top-down view of an example of a relatively wide optical wire bond apparatus that includes multiple arrays of waveguides separated by slots formed in the support member.

FIG. 7 is a top-down view (-z-direction) of an example optical wire bond apparatus 150 that has a relatively large width LY and can be divided up into multiple optical wire bond apparatus or used as a relatively wide single optical wire bond apparatus. The optical wire bond apparatus 150 of FIG. 7 can be separated (e.g., via laser cutting) into multiple sections, as indicated by the dashed cutting lines CL. In an example, support member 20 includes elongated apertures (i.e., slots) 166 that run in the long direction (i.e., the x-direction), i.e., substantially parallel to waveguides 100. In an example, slots 166 reside between arrays 100A of waveguides 100 to enhance the flexibility of the support member when undergoing lateral deflections or moderate twisting about the x-axis. The slots 166 thus enable the formation of a wide optical wire bond apparatus 150 capable of providing a large number of waveguide optical connections while remaining flexible under lateral deflections. This reduces the number of precision waveguide alignment and attachment operations required for integrating optical wire bond apparatus 150 into a photonic assembly that includes many OE-ICs and an OE-PCB with many optical waveguide structures. It also makes optical wire bond apparatus 150 more durable, which in turn increases the fabrication and integration yields of the apparatus as well as the photonic assembly.

Figure 8A:
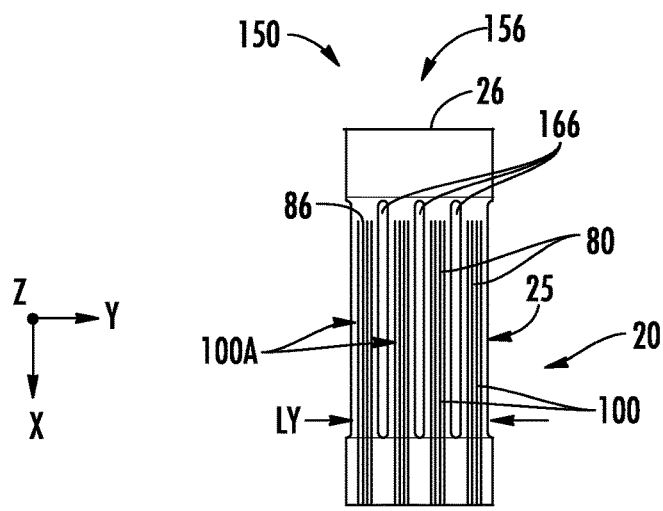
FIGS. 8A through 8C are top-down views of example wire bond apparatus that can be formed by separating out sections of the wide optical wire bond apparatus of FIG. 7.
Figure 8B:
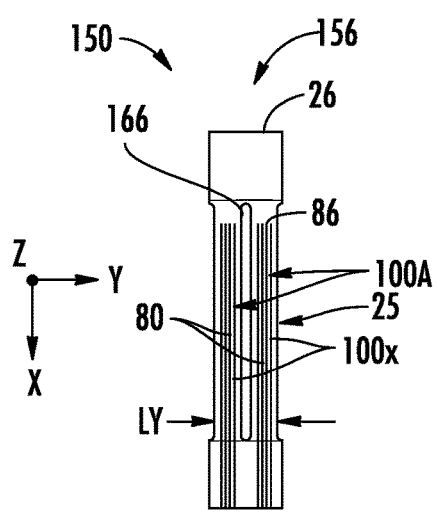
Figure 8C:
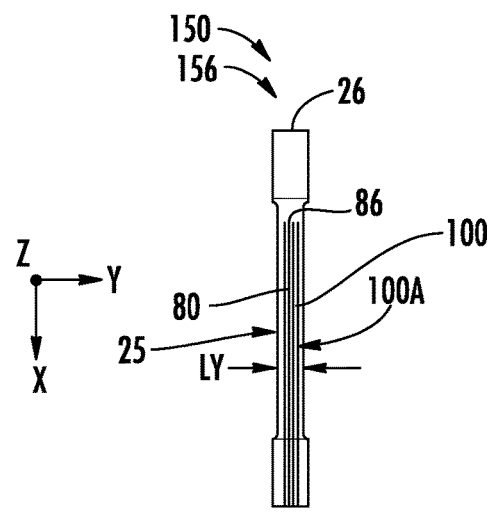

FIGS. 8A through 8C are top-down views of three example optical wire bond apparatus 150 that can be formed by dividing up the large optical wire bond apparatus of FIG. 7. The example optical wire bond apparatus 150 of FIG. 8A includes four waveguide arrays 100A spaced apart by three slots 166. The example optical wire bond apparatus 150 of FIG. 8B includes two arrays 100A of waveguides 100 spaced apart by a single slot 166. The example optical wire bond apparatus 150 of FIG. 8C includes a single array 100A of waveguides 100 as formed for example by cutting the large optical wire bond apparatus 150 of FIG. 7 at two adjacent slots 166. This defines a narrow optical wire bond apparatus 150. In an example, various types of optical wire bond apparatus 150 such as shown in FIGS. 8A through 8C having different numbers of waveguides 100 and different widths LY of support member 20 can be used in forming a photonic assembly as described below, depending on the particular configurations of the one or more OE-ICs and the OE-PCB employed.

Optical Wire Bond Apparatus and Methods Using Glass Preform

In an example, the support member 20 of optical wire bond apparatus 150 is formed using glass drawing techniques known in the art. Glass drawing techniques allow for the use of a preform that has the same overall shape as the final support member 20 but with larger dimensions. This scaling allows low cost preforms that are fabricated to relatively coarse mechanical tolerances (e.g., 25 microns to 50 microns) to be drawn down into very small rod components ("rods") with micron-scale mechanical tolerances.

Figure 9A:
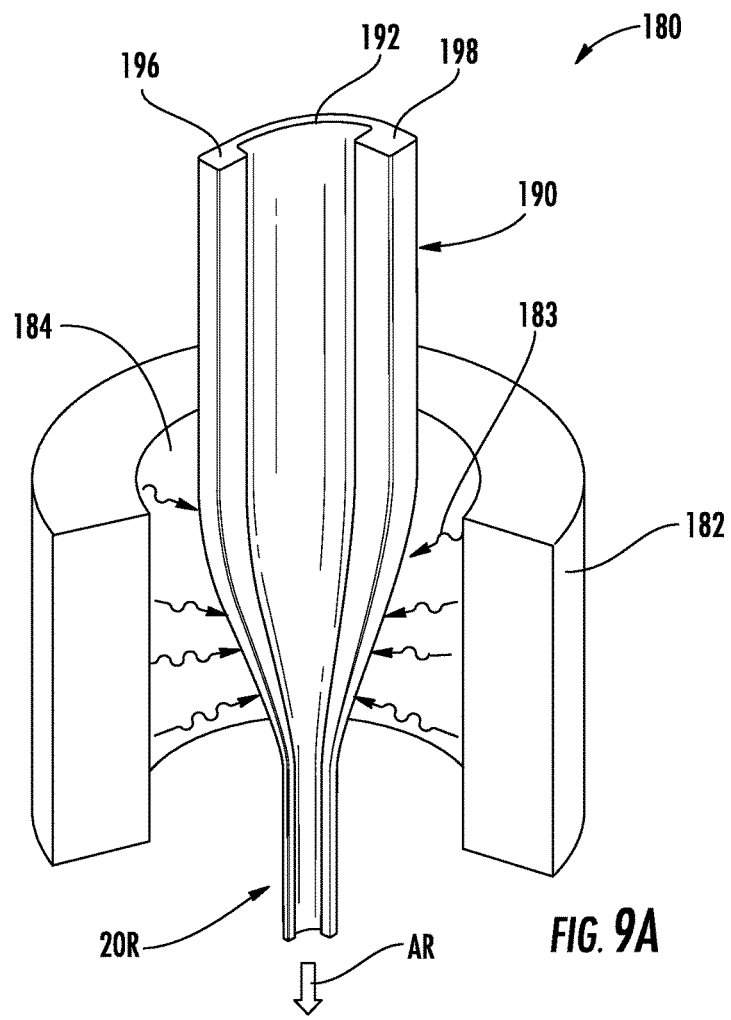
FIG. 9A is an elevated and partial cut-away view of a drawing system that shows an example of how the support member can be formed by drawing a preform.

FIG. 9A is a top-elevated and partial cut-away view of a drawing system 180 that includes a cylindrical heater 182 with an interior 184. An example preform 190 for forming support member 20 has a cross-sectional shape with a thin curved middle section 192 that connects two larger end sections 196 and 198. In an example, preform 190 is made of a glass that is substantially CTE-matched to silicon.

The preform 190 is operably arranged within drawing system 180 so that it passes through interior 184, which defines a preform heating region. The cylindrical heater 182 emits heat 183 that heats preform 190 to a suitable drawing temperature as it passes through the preform heating region of interior 184. The preform 190 is then drawn (e.g., by applying a drawing tension, as indicated by arrow AR) to form a reduced-dimension support member rod 20R.

In an example, the reduction in dimensions between preform 190 and support member rod 20R is about 10×. In another examples, a larger size preform 190 can be drawn down with a larger reduction in dimensions, e.g., with reduction factors of 100× to 1000×. In an example, support member rod 20R can be polished after it is drawn. While the general shape of preform 190 is preserved during the drawing process, some melting and rounding of exposed corners can occur due to preferential heating. Drawing experiments on rectangular glass blocks show that by reducing the drawing temperature to be, e.g., between 5% and 10% below normal drawing temperatures and increasing the drawing tension, rectangular corner features can be preserved with minimal corner rounding. For example, corner rounding can be obtained that is <10% of the width of a nearby flat feature.

Experiments also show that drawing at elevated temperatures can provide smooth outside surfaces of support member 20. Thus, it may not be necessary to polish the front and back ends 26 and 28 of support member 20 after drawing into rod 20R and then cutting the rod. Experiments show that outside corners with radii as small as 8 microns to 15 microns may be formed using a drawing processes. In this case, cores 80 formed near top surface 22 or bottom surface 24 of bend section 25 to obtain strong optical confinement can transition gradually at front-end core portion 80F to be deeper within body 21 to avoid rounded edges (see FIG. 3D).

If a non-uniform bend section 25 is desired, it can be incorporated into the shape of the initial preform 190. In other words, preform 190 can include a select form of bending in the curved middle section 192 that corresponds to a desired select bending in bend section 25 for support member 20.

Figure 9B:
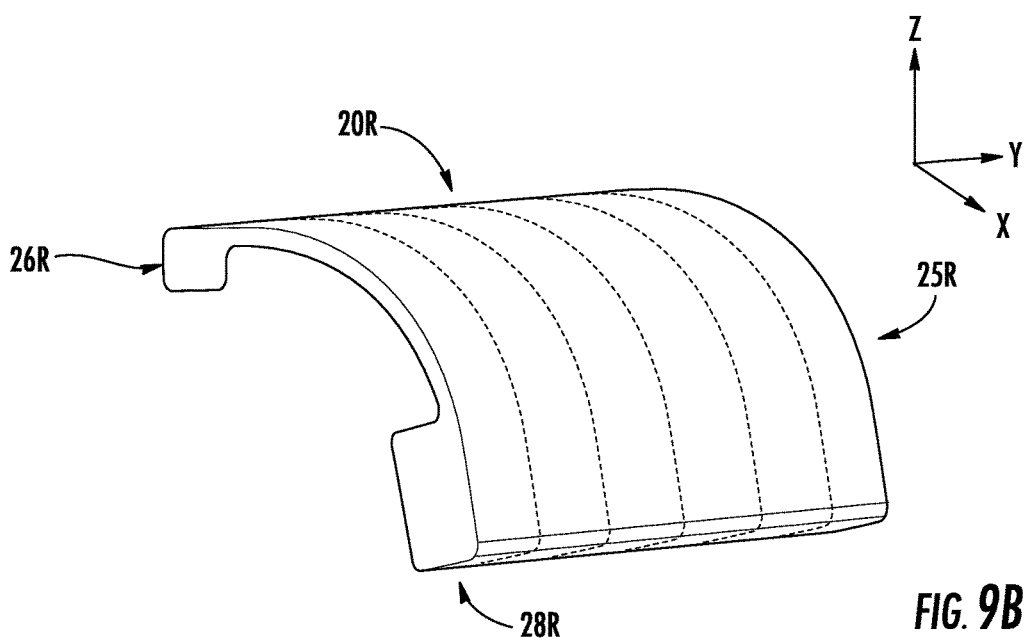
FIG. 9B is an elevated view of an example support member rod formed by the drawing system of FIG. 9A, illustrating how support members can be formed from the support member rod by dividing the support member rod into smaller sections.

FIG. 9B is a top-elevated view of an example support member rod 20R, which has front and back ends 26R and 28R and a bend section 25R. FIG. 9B illustrates an example of how support members 20 can be formed from the support member rod by dividing the support member rod into smaller sections. In an example, the support members 20 are formed by mechanically cutting support member rod 20R at select γ-positions along the length of the support member rod and then polishing the cut surfaces if necessary. In the example shown in FIG. 9B, the cutting is done in x-z planes, i.e., perpendicular to the long dimension (i.e., γ-dimension) of support member rod 10R.

Figure 10A:
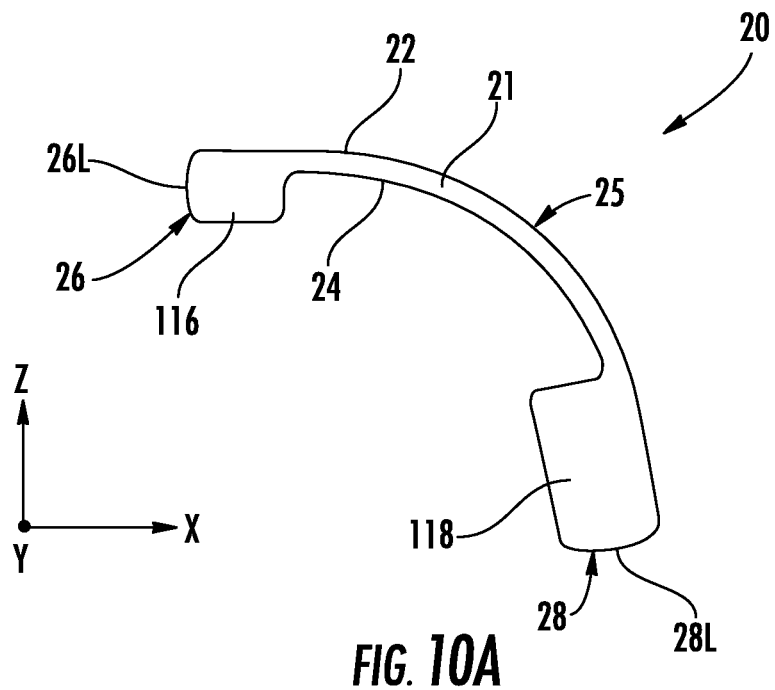
FIG. 10A is a side view of an example support member formed by the drawing system of FIG. 9A, wherein the support member includes integrally formed front-end and back-end support elements connected by a relatively thin curved bend section, and wherein the close-up insets that the front and back ends show optional curved surfaces that can serve as lenses.

FIG. 10A is a side view of the resulting example support member 20, which includes integrally formed front-end and back-end support elements 116 and 118 connected by a relatively thin curved bend section 25 of body 21. The integrally formed front-end and back-end support elements 116 and 118 are thus alternate embodiments of support members that are added to support member 20 such as described above in connection with the support member formed by bending glass sheet 20GS. Note that support members 20 formed using a drawing process are monolithic and thus in an example do not require adding other elements or features to the support member other than cores 80.

In an example, front and back ends 26 and 28 have flat surface, either form the drawing process or by polishing. In another example, the glass drawing process is carried out under conditions that create smooth outside surfaces at front and back ends 26 and 28, wherein these smooth outer surfaces have respective front-end and back-end curvatures that can serve as front-end and back-end lenses 26L and 28L, as shown in the close-up insets of FIG. 10A. For example, one-dimensional curvature at front end 26 can define a front-end cylindrical lens 26L that can be used to improve or optimize coupling between waveguides 100 and waveguides of an external device that support differently shaped (e.g., non-circular) guided modes. In an example, the front-end core portion 80F of core 80 can gradually (e.g., adiabatically) widen as it approaches front end 26 so that the front-end cylindrical lens 26L can transmit or receive a relatively large collimated beam.

Figure 10B:
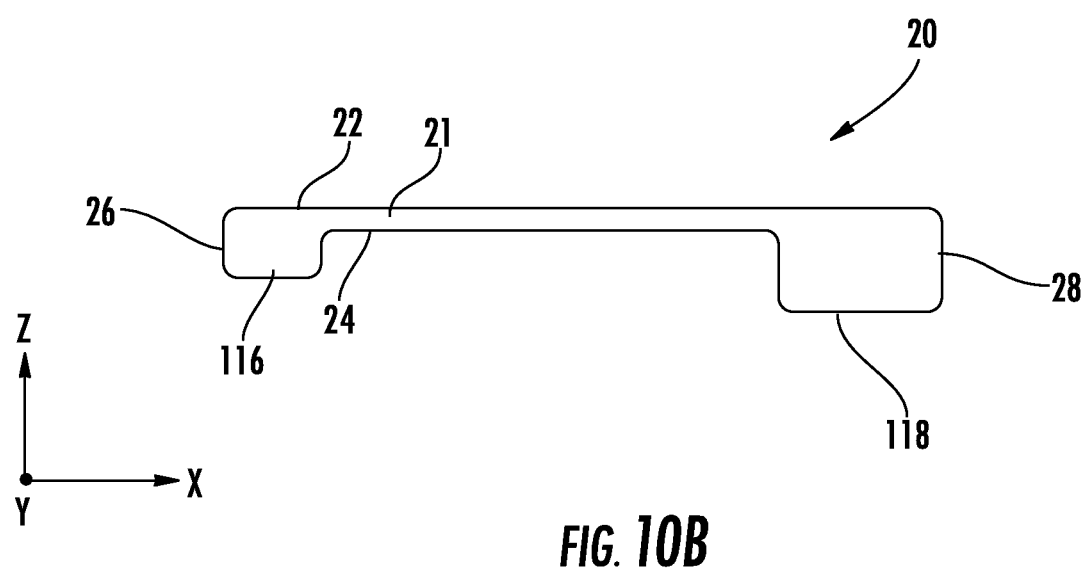
FIG. 10B is similar to FIG. 10A and illustrates an example support member wherein the integrally formed front-end and back-end support elements are connected by a straight section that can be formed into a permanent bend section by the application of heat and letting the support member cool.

FIG. 10B is similar to FIG. 10A and shows an example support member 20 wherein there is no bend section 25. The bend section 25 can be formed using heat 44, in the same manner as discussed above in connection with bending the thin glass sheet.

Figure 11A:
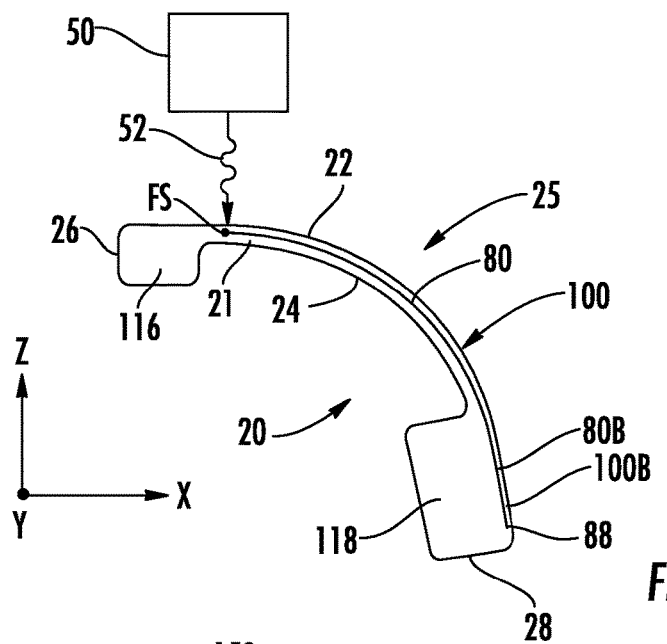
FIG. 11A is a side view of the support member of FIG. 10A shown along with a laser system and illustrating an example of forming one or more cores in the body of the support member.

FIG. 11A is a side view of the support member 20 of FIG. 10A shown along with laser system 50 and illustrating an example of forming one or more cores 80 in body 21 near top surface 22 using laser writing. The resulting support member 20 with core 80 and the corresponding waveguide 100 is shown in FIG. 11B and constitutes optical wire bond apparatus 150 further along in its fabrication.

Figure 11B:
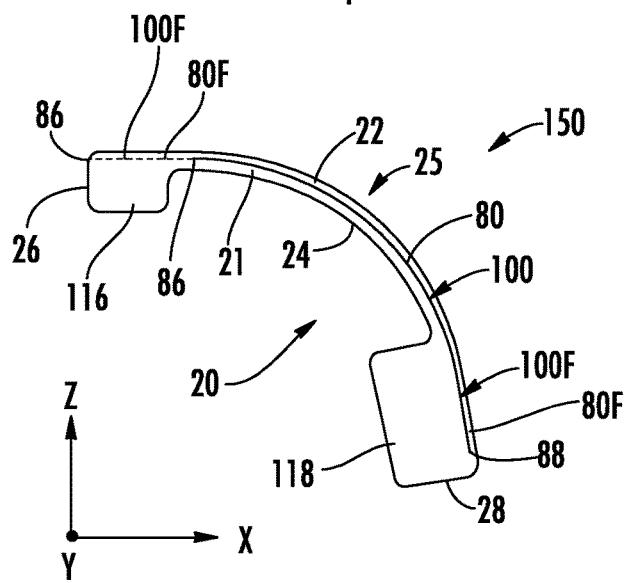
FIG. 11B is similar to FIG. 11A and shows the resulting support member with a core formed therein to define an initial optical wire bond apparatus.
Figure 11C:
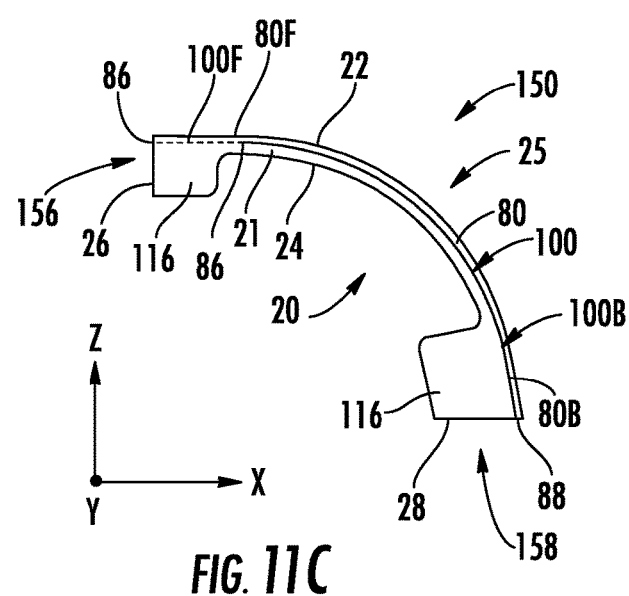
FIG. 11C is similar to FIG. 11B and shows the front and back ends of the optical wire bond apparatus having been polished flat.

FIG. 11C shows is similar to FIG. 11B and shows the front and back ends 26 and 28 of the support member 20 of FIG. 11B having been polished to form a flat front end 156 and a flat back end 158 of optical wire bond apparatus 150, wherein the core back end 88 resides at back end 158 and wherein the front-end core portion 80F has yet to be formed and so is indicated by the dashed line. This polishing operation, like the laser writing process, can be implemented on drawn support member 20 that supports multiple optical wire bond apparatus 150 that can subsequently be separated using for example dicing or sawing or laser cleaving process.

As noted above, front and back ends 26 and 28 of support member 20 can also be formed (e.g., via drawing) with flat surfaces that provide the desired angle. In this case no additional polishing process may be required. This modified approach requires the ability to form small radii corners using the draw process so that only small lateral displacement of waveguide 100 is required to avoid intercepting the curved corner radius portion of the front end 26 and/or back end 28.

Figure 12A:
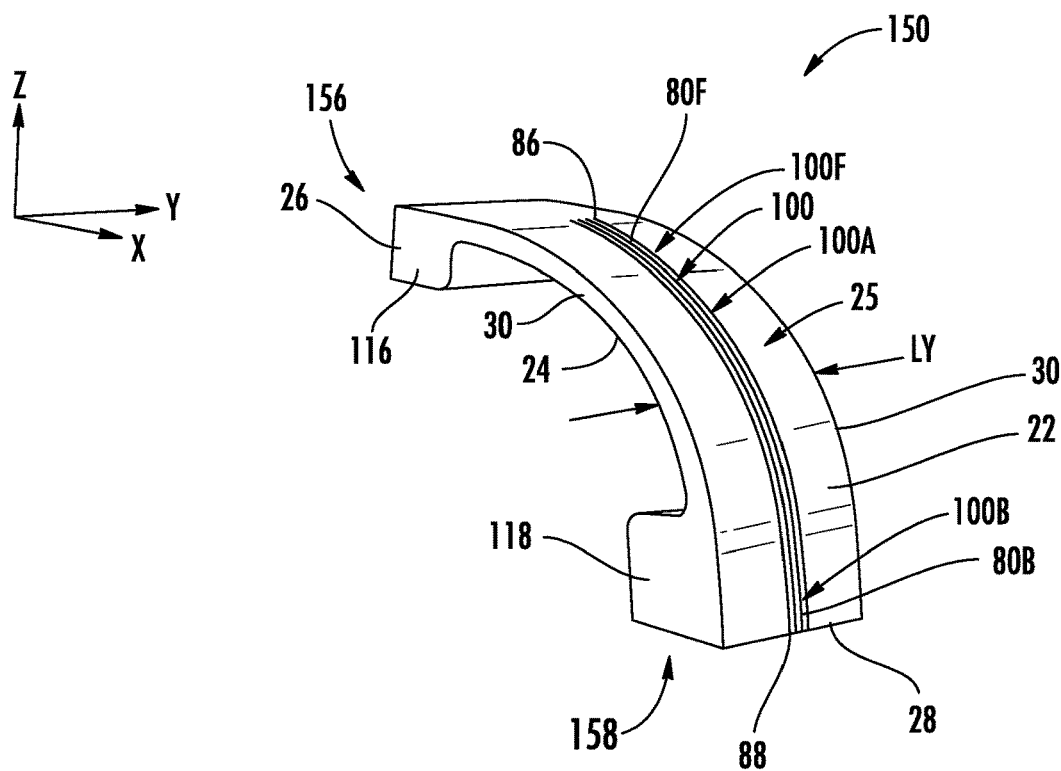
FIGS. 12A through 12C are elevated views of different examples of the optical wire bond apparatus of FIG. 11C.
Figure 12B:
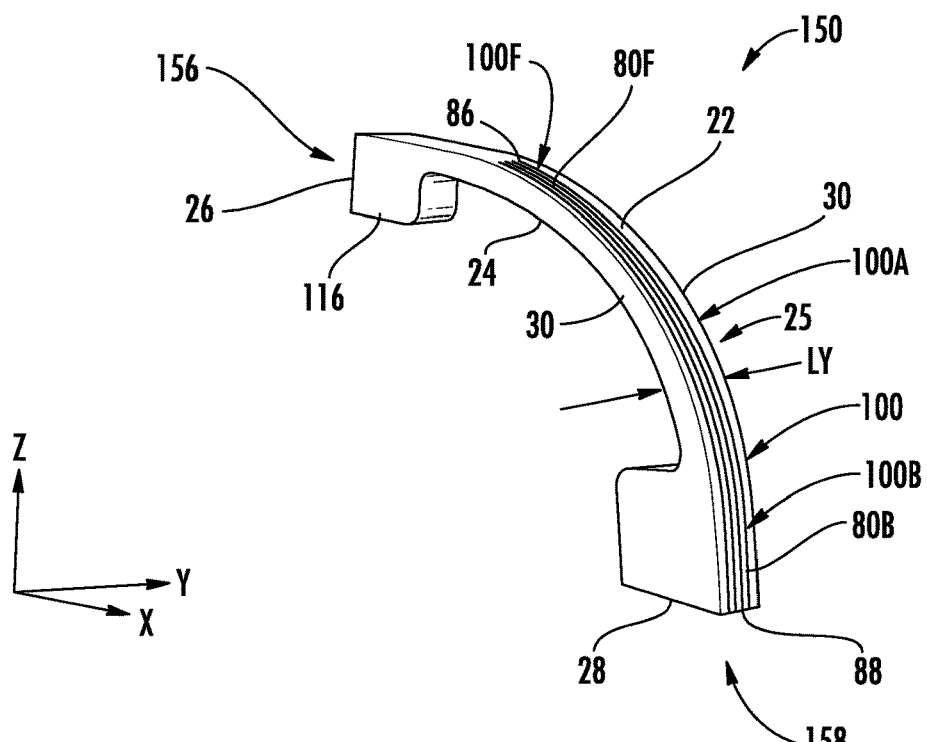
Figure 12C:
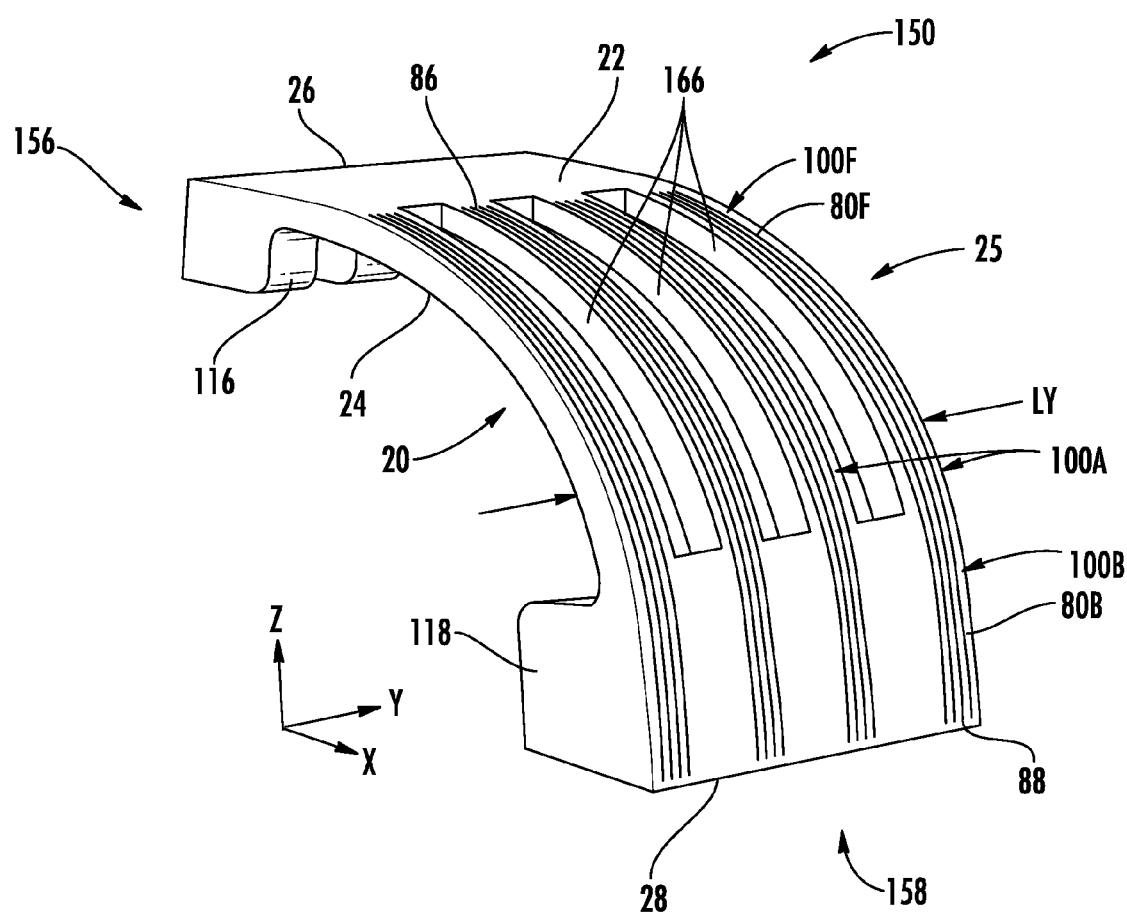

FIGS. 12A through 12C are elevated views of examples of the optical wire bond apparatus 150 of FIG. 11C. The optical wire bond apparatus 150 of FIG. 12A has multiple waveguides 100 arranged in a single array 100A and has a relatively large width LY while the optical wire bond apparatus of FIG. 12B includes the same array 100A of waveguides 100 but has a relatively small width LY. The optical wire bond apparatus 150 of FIG. 12C includes multiple arrays 100A of waveguides 100 separated by slots 166, which allow greater flexing of support member 20. As noted above, the example optical wire bond apparatus 150 of FIGS. 12A through 12C can be formed by cutting a larger optical wire bond apparatus into sections, e.g., by sawing, laser cleaving, etc. Convenient locations for performing the separation are at slots 166.

Figure 13A:
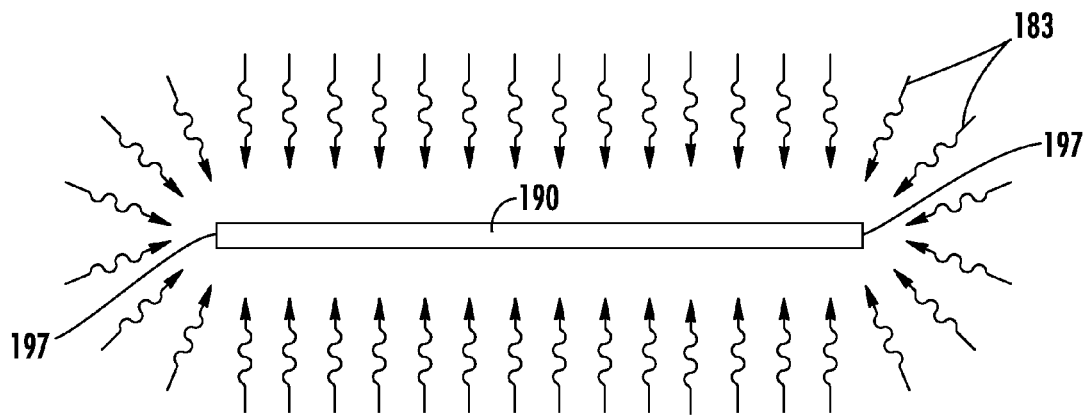
FIG. 13A is a side view of an example ribbon preform being heated from all sides during the drawing process.

FIG. 13A is a cross-sectional view of an example preform 190 in the form of a thin glass sheet or ribbon ("ribbon preform") that extends into and out of the page and that has a rectangular cross-section defined by rectangular edges 197. FIG. 13A also shows heat 183 from cylindrical heater 182 (not shown) being applied during the drawing process using drawing system 180 of FIG. 9A. Since edges 197 of the thin glass ribbon preform 190 are exposed to heat 183 from all sides, they become hotter than the glass located in the middle section of the preform.

Figure 13B:
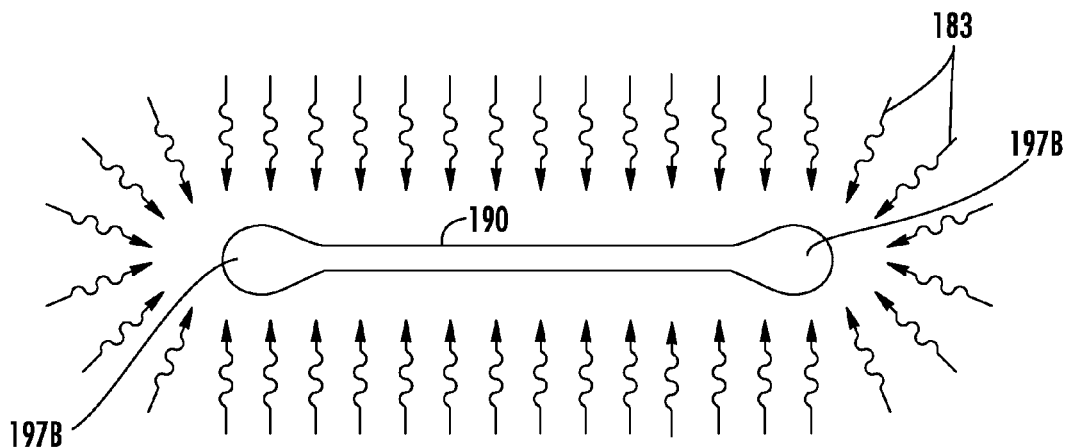
FIG. 13B is similar to FIG. 13A and shows how the ribbon preform front and back ends can take on a bulbous shape during the drawing process.

By adjusting the amount of applied heat 183, the draw speed and draw tension, the surfaces at the edges 197 of ribbon preform 190 can be made to melt and flow via surface tension to form front and back bulbous edges 197B, as illustrated in the cross-sectional view of FIG. 13B. The resulting bulbous support member rod 20R and support members 20 have the same cross-sectional shape but with reduced dimensions relative to ribbon preform 190.

Figure 13C:
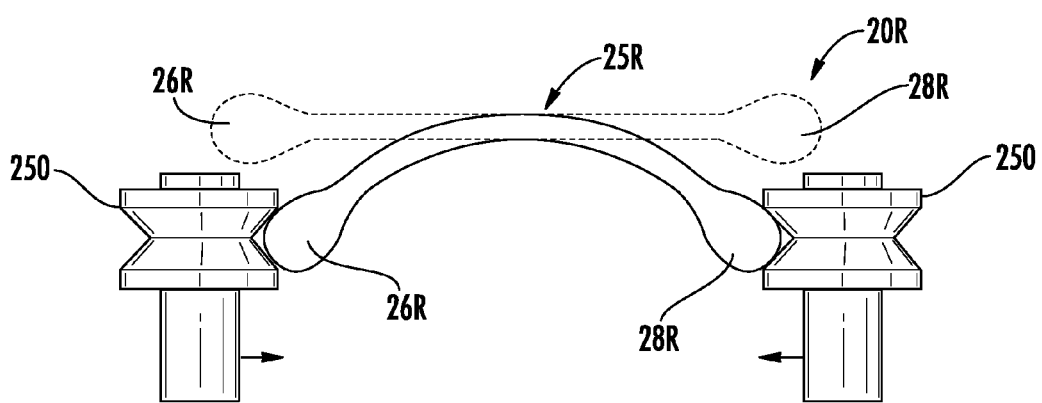
FIG. 13C is a side view of the resulting ribbon preform rod supported at the front and back ends by movable support fixtures and showing how the application of heat to the middle section of the support member rod combined with the movement of the support fixtures can be used to form a bend section in the support member rod.

FIG. 13C shows the bulbous support member rod 20R being supported at front and back bulbous edges 26R and 28R by respective movable support fixtures 250, which reside downstream of cylindrical heater 182 and receive the bulbous support member rod 20R while it is still hot. The movable support fixtures 250 can be formed from a material to which hot glass does not stick. Examples of such materials include graphite and zirconia. The support fixtures 250 are then moved towards each other to bend the bulbous support member rod 20R to form a bend section 25R. This heating and bending process can also be carried out on individual straight support members 20 by first cutting a straight (i.e., unbent) bulbous support member rod 20R into separate support members. The bulbous edges 26R and 28R define bulbous ends of the corresponding support members 20 formed from bulbous support member rod 20R.

The bending process ensures that curved to surface 22 of bend section 25 of support member 20 is untouched so that it remains extremely smooth for the subsequent laser writing processes that form cores 80 and corresponding waveguides 100.

OE-IC to OE-PCB Connection using Optical Wire Bond Apparatus

Aspects of the disclosure include using optical wire bond apparatus 150 to optically connect an OE-IC to an OE-PCB. The optical wire bond apparatus 150 thus serves as an optical interface device. The discussion below and the corresponding Figures refer to a thin version of optical wire bond apparatus 150 that includes a single waveguide 100 for ease of discussion and illustration. The systems and methods discussed below are applicable to the all of the configurations of optical wire bond apparatus 150 disclosed herein, including those that include multiple waveguides 100 and multiple waveguide arrays 100A as defined by multiple cores 80.

Figure 14A:
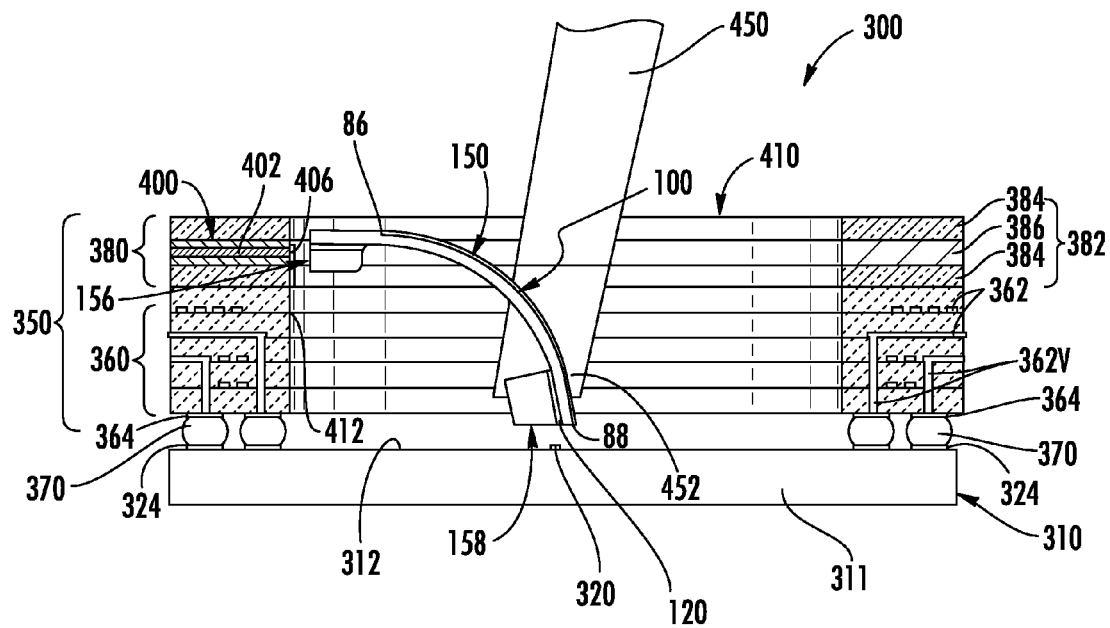
FIGS. 14A through 14H are side cut-away views of an example photonic assembly in the process of being integrated by the addition of an optical wire bond apparatus that optically connects an OE-IC to an OE-PCB.

FIG. 14A is a side cut-away view of an example photonic assembly 300. The photonic assembly 300 includes an OE-IC 310 operably arranged relative to an OE-PCB 350 in a flip-chip configuration. The OE-IC 310 includes a substrate 311 with an upper surface 312 that includes at least one photonic device 320. The photonic device 320 can be any device, element, component, etc. that emits or receives light in a normal or near-normal direction, including for example, active devices, such as laser sources and photodetectors, or passive devices, such as grating couplers, turning mirrors, or any type of light guiding structure that emits or receives light. The upper surface 312 also includes solder-ball pads 324 that connector to internal wiring (not shown) within and/or on the substrate upper surface. The OE-PCB 350 includes a bottom section 360 and a top section 380. The bottom section 360 operably supports electrical interconnections in the form of metal wiring 362, which includes vias 362V that lead to solder-ball pads 364. The bottom section is supported above OE-IC 310 by solder balls 370 operably arranged between solder-ball pads 324 and 364. The solder balls 370 serve to electrically connect the OE-IC 310 to the OE-PCB 350.

The top section 380 resides atop bottom section 360 and includes a support layer 382 that operably supports at least one optical waveguide structure 400 having a core 402 and an end 406. In an example, support layer 382 is formed by two glass sheets 384 that sandwich a spacer sheet 386. The at least one optical waveguide structure 400 replaces a portion of the spacer sheet 386 so that the optical waveguide structure is sandwiched by the two glass sheets 384 and is thus embedded in the top section 380. In an example, optical waveguide structure 400 is in the form of or includes an optical fiber. In other examples, the optical waveguide structure 400 is formed as a slab waveguide or other non-fiber type of waveguide formed, for example, using photolithography techniques. The top section 380 of OE-PCB 350 can support multiple optical waveguide structures 400 and one such optical waveguide is shown for ease of illustration and discussion. The OE-PCB 350 can also have other configurations that support one or more optical waveguide structures.

In an example, top section 380 comprises the optical portion of the OE-PCB 350 while the bottom section 360 comprises the electrical portion of the OE-PCB.

In an example, OE-PCB 350 includes an access aperture 410 through the top and bottom sections 360 and 380 and sized to accommodate optical wire bond apparatus 150. In an example, access aperture 410 has a square cross-sectional shape. The access aperture 410 defines an inner wall 412 at which the end 406 of optical waveguide structure 400 resides.

In an example, optical wire bond apparatus 150 is operably installed in photonic assembly 300 using access aperture 410. This can be accomplished by using a handling device 450 that has a distal end 452 configured to hold optical wire bond apparatus 150. The handling device can be operably connected to and controlled by a micropositioning system (not shown). The handling device 450 is configured to releasably hold optical wire bond apparatus 150 and is sized to allow for insertion of the optical wire bond apparatus 150 into access aperture 410 down to the upper surface 312 of OE-IC 310, as shown in FIG. 14A. In an example, handling device 450 releasably grips optical wire bond apparatus 150 at back-end support element 118. Alternatively the handling location can be close to or at the front-end support element 116, depending on the stiffness of support member 20. In an example, handling device 450 uses mechanical means to releasably attach to optical wire bond apparatus 150, while in another example the handling device includes a vacuum-based end effector.

Figure 14B:
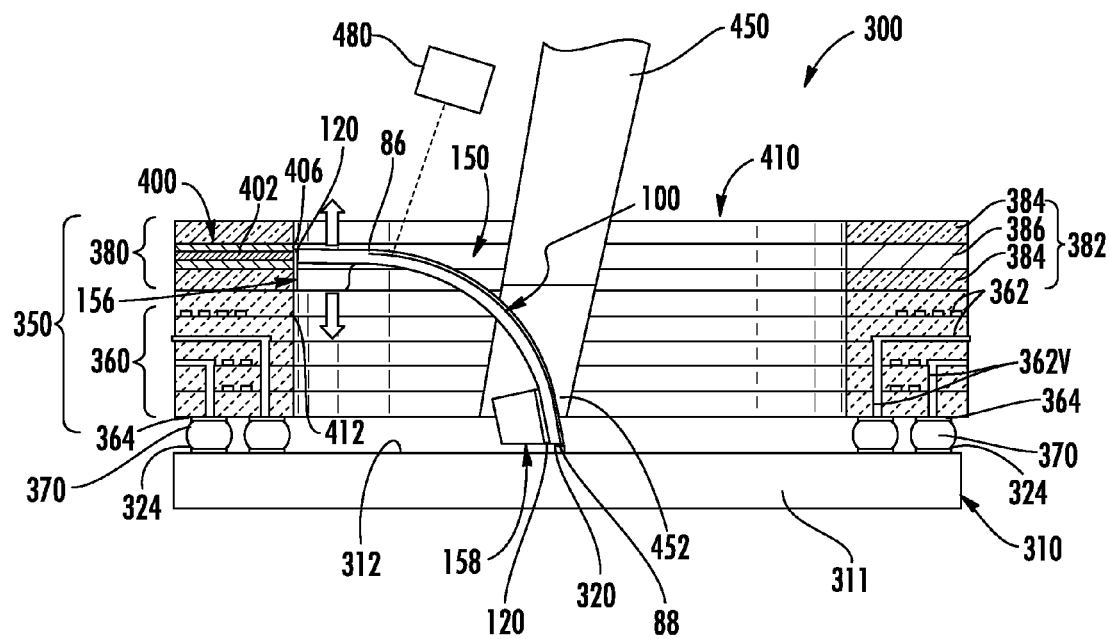

FIG. 14B is similar to FIG. 14A and shows how handling device 450 positions optical wire bond apparatus 150 so that the front end 156 of the optical wire bond apparatus resides adjacent optical fiber end 406 in top section 380 of OE-PCB 350 while the back end 158 resides adjacent photonic device 320 of OE-IC 310. The front end 156 of optical wire bond apparatus 150 is then generally aligned with optical waveguide structure 400 of top section 380 of OE-PCB 350 while the back-end portion 100B of waveguide 100 at the back end 156 of the optical wire bond apparatus is generally aligned with photonic device 320 of OE-IC 310. In an example, multiple waveguide structures 400 and multiple photonic devices 320 are generally aligned with the respective multiple waveguides 100 at front and back ends 156 and 158 of optical wire bond apparatus 150.

In an example, a transparent adhesive 120, such as a light-curable adhesive material activated by actinic light 122 (see FIG. 14C), is disposed between front end 156 of optical wire bond apparatus 150 and inner wall 412 where the end 402 of optical waveguide structure 400 resides. A coarse alignment of front end 156 of optical wire bond apparatus 150 to optical waveguide structure 400 of OE-PCB 350 may be carried out since the components only need to be laterally aligned to with 25 microns to 50 microns. Single mode optical waveguides usually must be aligned to within less than 1 micron for low loss coupling. Allowing coarse alignment at this interface speeds the joining process by enabling vision alignment typically used with pick-and-place machines. Components may also be passively aligned using mating features designed to provide 25 micron to 50 micron lateral alignment.

Figure 14C:
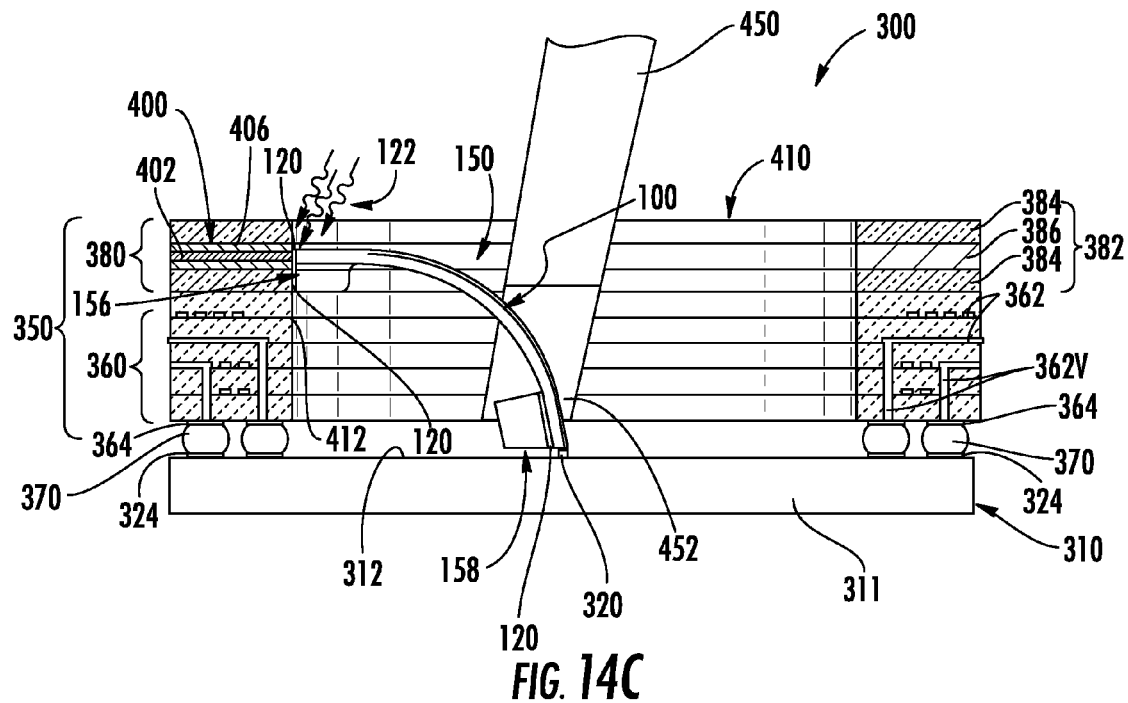

After coarse alignment of front end 156 of optical wire bond apparatus 150 to optical waveguide structure 400, adhesive 120 is cured, e.g., by exposure to actinic light 122, which in an example is ultraviolet (UV) light, as shown in FIG. 14C. This attaches the front end 156 of optical wire bond apparatus 150 to inner wall 412 of the top section 380 of OE-PCB 350. In this configuration, the front-end support element 116 provides added support for the mechanical interface between the front end 156 of optical wire bond apparatus 150 and the inner wall 412 of the top section 380 of OE-PCB 350.

The coarse alignment requirement makes the joining interface tolerant of any micron-scale lateral shifts that might occur during UV adhesive curing of any thicker adhesive layers required for a mechanically robust interface. Since the joining process is so tolerant to lateral misalignment, it makes the yield of the joining process extremely high. This helps boost the yield of the photonic assembly fabrication process.

Note that in this example, the front-end core portion 80F of core 80 has yet to be formed. Thus, at this stage, the front-end alignment of optical wire bond apparatus 150 need only be a coarse alignment, i.e., not optimum alignment. For example, the coarse alignment tolerance at this stage can be about 50 microns or so, which is well within the placement tolerances associated with standard electronic component pick-and-place equipment.

Next, a measurement system 480 (FIG. 14B) is used to determine the precise location of cores 402 of optical waveguide structures 400 in the OE-PCB. In an example, the measurement system comprises a vision system combined with back illumination optical waveguide structures 400, via, for example near normal reflection of downward directly light off the photonic chip surface 312 before traveling upward to the waveguide core 402 within front end 156. The measurement system 480 can also determine the position of cores 80 of waveguides 100 formed in support member 20 of optical wire bond apparatus 150.

Figure 14D:
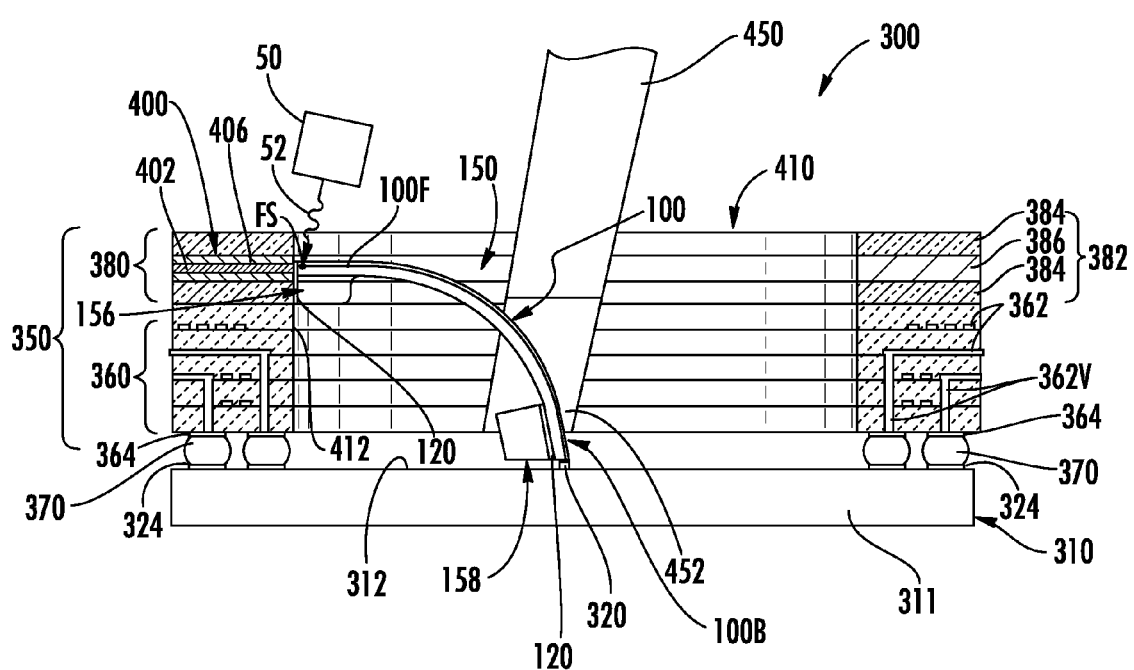

FIG. 14D is similar to FIG. 14C and illustrates the next step in the method wherein laser beam 52 from laser system 50 is used to laser write the front-end core portion 80F, which extends all the way to the front end 26 of support member 20 and defines core end 86 at the front end. The front-end core portion 80F is formed so that core front end 86 is closely aligned with the front end 406 of the core 402 of optical waveguide structure 400. This process is carried out for each waveguide 100 supported by support member 20.

If the front-end portions 100F of waveguides 100 are written in advance all the way to the front end 26 of support member 20, then instead of a coarse alignment process, a more precise active alignment can be used, similar to the alignment process described below for interfacing the back-end portion 100B of waveguides 100 to photonic devices 120. An advantage of not having to carryout two active alignment processes is that when two such processes are required, no low-loss optical link exists through the optical wire bond apparatus 150. This makes active alignment at the first interface difficult, because no active measurement of light coupling through the interface can be made.

Figure 14E:
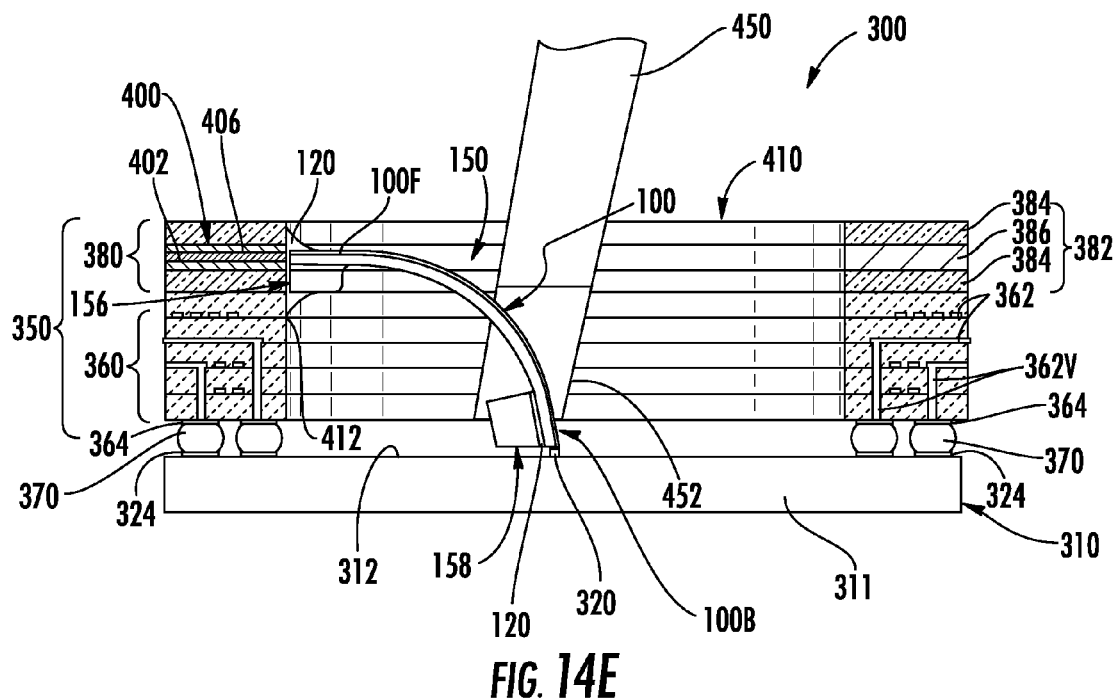

FIG. 14E is similar to FIG. 14D and illustrates an example wherein additional adhesive 120 is applied at front end 156 of optical wire bond apparatus 150 to form a fillet where the front end interfaces with inner wall 412 of top section 380 of OE-PCB 350. This strengthens the attachment between OE-PCB 350 and optical wire bond apparatus 150, which will typically experience stress at this location when the back end 158 of the optical wire bond apparatus is mechanically displaced for fine alignment and attachment to OE-IC 310.

Figure 14F:
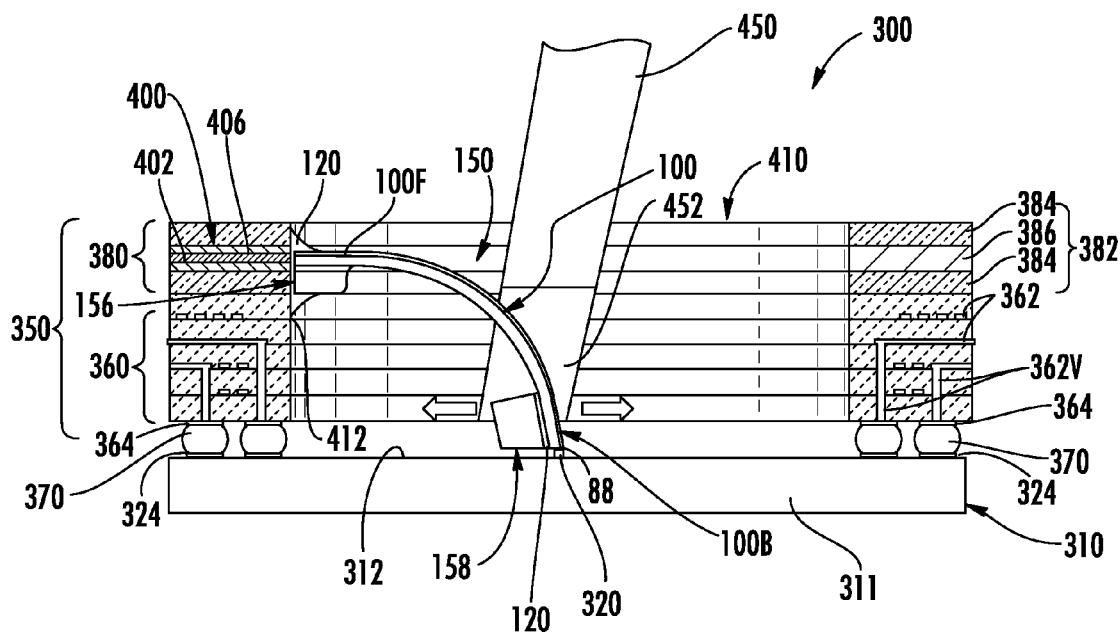

FIG. 14F is similar to FIG. 14E and illustrates the next step of aligning back end 158 of optical wire bond apparatus 150 to OE-IC 310, which includes aligning back end 88 of core 80 to photonic device 320 supported by the OE-IC. In an example, this alignment is performed by using handling device 450 to bring back end 158 of optical wire bond apparatus 150 into position and then using active alignment techniques to achieve a position that results in fine alignment. In an example, active alignment includes activating the photonic device 320, which may be an optical transmitter or an optical receiver (or an optical transceiver), and then measuring either a received signal or a transmitted signal that travels over waveguide 100. Optimizing the transmitted or received signal determines the fine alignment position.

The adhesive 120 can be applied at the back end 158 and the upper surface 312 of the OE-IC substrate 310 during this fine alignment process or after the fine alignment position is established. The adhesive 120 is cured after the fine alignment position has been established, thereby attaching the back end 158 of optical wire bond apparatus 150 to the upper surface 312 of the OE-IC substrate 311. The resulting structure is shown in FIG. 14F. Note that in this configuration, the back-end support element 118 provides added support for the mechanical interface between the back end 156 of optical wire bond apparatus 150 and the upper surface 312 of substrate 311 of the OE-IC chip 310.

In an example where waveguides 100 have cores 80 with diameters in the range from 50 microns to 62.5 microns and are multimode waveguides, the fine alignment of photonic device 320 relative to core back end 88 is 10 microns or less in the lateral direction and may be 5 microns or less. An alignment accuracy of 5 microns is readily achievable in just a few seconds using standard equipment used in semiconductor manufacturing and device assembly. If single-mode laser written waveguides 100 are used (e.g., with cores 80 having a diameter in the range from 6 to 9 microns), the fine alignment of photonic device 320 relative to core back end 88 is 1 microns or less in the lateral direction and may be less than 0.5 micron.

The alignment process may require lateral movement of at least one end of the optical wire bond apparatus 150 relative to the opposite end. This lateral movement induces strains on support member 20 because the flip-chip assembly process results in misalignments between OE-IC 210 and OE-PCB 350 that need to be corrected. Thus, to obtain proper alignment, the front and back ends 156 and 158 of optical wire bond apparatus 150 may need to be laterally displaced, e.g., by up to 100 microns from their neutral positions. An advantage of optical wire bond apparatus 150 is that it is designed to be sufficiently flexible so that the position of its front and back ends 156 and 158 can be adjusted during the alignment process without breaking support member 20.

The glass construction of optical wire bond apparatus 150 is advantageous in that the actinic light 122 used for light-curing of adhesive 170 can be transmitted through the optical wire bond apparatus. This property is particularly useful when optical wire bond apparatus 150 is located within access aperture 410. If needed, handling device 450 can also be fabricated from materials that transmit actinic light 122 to facilitate the light-curing of adhesive 120. The handling device 450 can also be configured to guide actinic light 122 by having one or more internal light-guiding features, such by having a longitudinal section that is internally reflective. Such light guiding can be used direct actinic light 122 to adhesive 120 to cure the adhesives.

Figure 14G:
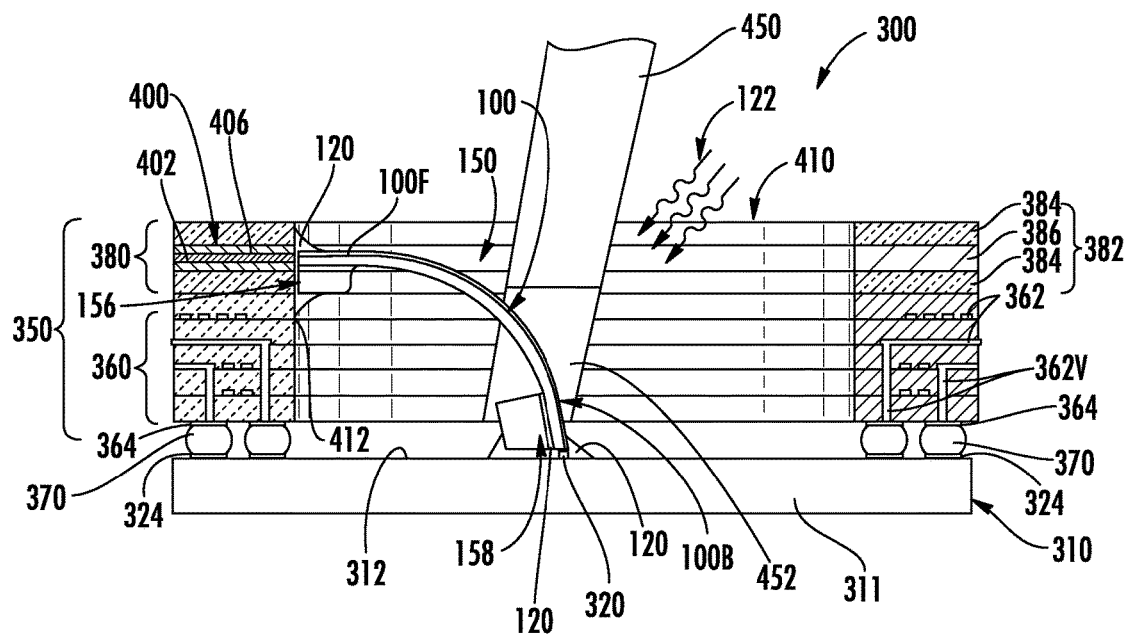
Figure 14H:
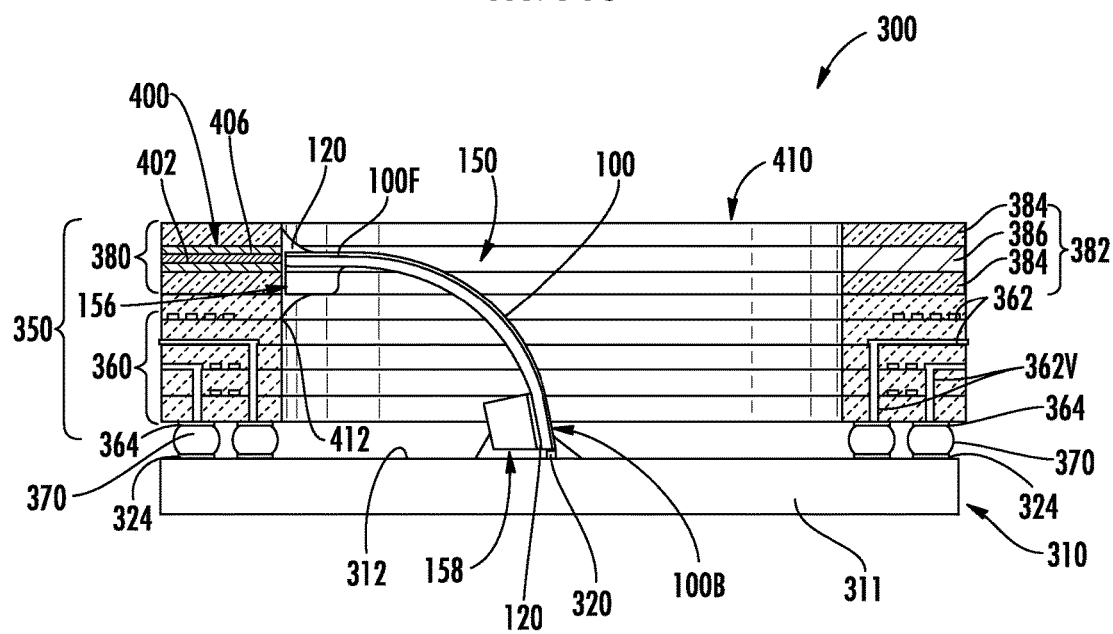

After aligning and securing optical wire bond apparatus 150 to OE-IC 310 and OE-PCB 350, the handling device 450 releases the optical wire bond apparatus and is removed from access aperture 410, leaving the completed photonic assembly 300 as shown in FIG. 14G.

As described above, the need for an initial precision alignment of waveguides 100 in optical wire bond apparatus 150 to the optical waveguide structures 400 in OE-PCB 350 can be avoided by forming the front-end core portions 80F after the front end 156 of the optical wire bond apparatus has been operably disposed and coarsely aligned relative to the OE-PCB. In cases where the waveguides 100 and 400 exist on precise 1D or 2D arrays, active alignment of waveguides 100 to waveguide structures 400 can be accomplished rapidly in one step. For example, optical waveguide structures 400 may be formed at precise locations with precise pitch using photolithographic exposure techniques. The front-end core portions 80F of cores 80 that define waveguides 100 can be formed at precise locations using a similar process or by using laser writing to have a matching pitch.

It should be noted, however, that performing simultaneous active alignment at both the front and back ends 26 and 28 the support member 20 introduces additional degrees of freedom in the micropositioning system (not shown) used to accurately control and position the handling device 450. These degrees of freedom also increase the required time for active alignment, because of the larger 4D search space, as opposed to the 2D search space required if active alignment is only carried out at a single interface.

Since optical wire bond apparatus 150 is flexible, it deflects or bends without breaking to accommodate motion of OE-IC 310 relative to OC-PCB 350 due for example to a CTE mismatch during thermal cycling. As noted above, the CTE mismatch can be reduced or minimized by the use of glass for support member 20 since typical OE-ICs 310 and OE-PCBs 350 have CTE values similar to that of glass. Usually, an exact CTE match is not possible so that there is some deflection due to differences in CTE.

In practice, the above-described formation of photonic assembly 300 may be implemented upside down from the way it is shown in FIGS. 14A through 14G. Further, the optical wire bonding methods used to form photonic assembly 300 can be carried out after standard electronics industry attachment of semiconductor chips on PCB substrates. As a result, no changes in the chip attachment process are required. Like electrical wire bonding, the optical wire bonding systems and methods disclosed herein can be used to define a high-yield process that can be employed late in the assembly process.

As described above in connection with FIGS. 4B and 4D, support member 20 can support a 2D arrangement of waveguides 100, e.g., with waveguides formed adjacent the top surface 22 and the bottom surface 22 of the support member, at one or both of front and back ends 26 and 28. Such an optical wire bond apparatus 150 can be used to optically connect to an OE-PCB 350 that includes corresponding arrangement of 2D arrangement of optical waveguide structures 400 in top-section 380 and/or a 2D arrangement of photonic devices 320 supported by OE-IC 310.

It is also noted waveguides 100 formed in support member 20 can be positioned essentially at any depth within body 21 and can be formed to traverse any reasonable path through body 21. Thus, waveguides 100 can be written to align to optical waveguide structures 400 even if the spacing between these optical waveguides is not precisely controlled. This enables a high-density layout of optical waveguide structures 400 on OE-PCB 50 and fabrication processes for photonic assembly 300 having relaxed tolerances.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A photonic assembly comprising:
   an optical-electrical integrated circuit (OE-IC) that operably supports at least one photonic device;
   an optical-electrical printed circuit board (OE-PCB) that operably supports at least one waveguide structure comprising a core;
   an optical wire bond apparatus that includes a flexible glass support member having a body, a top surface, a bottom surface, a front end that includes a front-end support element, a back end that includes a back-end support element, and a bend section between the front and back ends, the flexible glass support member operably supporting at least one optical waveguide defined in the body and that extends from the back end to the front end, wherein the bend section is thinner than the front end and the back end; and
   the optical wire bond apparatus being arranged with a front end of the at least one optical waveguide adjacent and in optical communication with the at least one waveguide structure of the OE-PCB and a back end of the at least one optical waveguide adjacent and in optical communication with the at least one photonic device of the OE-IC.

2. The photonic assembly according to claim 1, wherein the flexible glass support member is monolithic and made from a chemically strengthened glass.

3. The photonic assembly according to claim 1, wherein the at least one optical waveguide includes multiple waveguides arranged in one or more arrays.

4. The photonic assembly according to claim 1, wherein the flexible glass support member includes one or more slots that run substantially parallel to the at least one optical waveguide.

5. The photonic assembly according to claim 1, wherein the OE-PCB and the OE-IC are operably arranged in a flip-chip configuration.

6. The photonic assembly according to claim 5, wherein the OE-PCB includes an access aperture, and wherein the optical wire bond apparatus resides in the access aperture.

7. The photonic assembly according to claim 1, wherein a transparent light-activated adhesive attaches the front end of flexible glass support member and the front-end support element to the OE-PCB and the back end of the flexible glass support member and the back-end support element to the OE-IC.

8. The photonic assembly according to claim 1, wherein the at least one waveguide is defined by at least one core that resides within 10 microns of the top surface or the lower surface of the flexible glass support member at the bend section.

9. The photonic assembly according to claim 1, wherein the at least one waveguide structure supported by the OE-PCB comprises at least one optical fiber.

10. An optical wire bond apparatus for optically interconnecting an optical-electrical integrated circuit (OE-IC) that operably supports at least one photonic device and an optical-electrical printed circuit board (OE-PCB) that operably supports at least one optical waveguide structure comprising a core, comprising:
  a flexible support member having a body made of glass with a refractive index nb, a top surface, a bottom surface, a front end, a back end, a bend section between the front and back ends that defines a height, a front-end support element that resides adjacent the front end of the support member, and a back-end support element that resides adjacent the back end of the support member, wherein the front-end support element and the back-end support element are monolithically formed with the body of the flexible support member, wherein the bend section is thinner than the front end and the back end; and
  at least one core formed within the body of the flexible support member and that extends from the back to the front end and that resides within 10 microns of either the top surface or bottom surface of the support member, the at least one core having a refractive index nc, where nc>nb and defining at least one waveguide.

11. The optical wire bond apparatus according to claim 10, wherein the at least one core comprises a plurality of cores that define a plurality of waveguides.

12. The optical wire bond apparatus of claim 11, wherein the plurality of cores have a one-dimensional configuration adjacent the bend section and have a two-dimensional configuration at one or both of the front and back ends of the support member.

13. A photonic assembly comprising:
  the optical wire bond apparatus according to claim 10;
  the OE-IC and the OE-PCB; and
  the optical wire bond apparatus being arranged with a front end of the at least one optical waveguide adjacent and in optical communication with the at least one waveguide structure of the OE-PCB and a back end of the at least one optical waveguide adjacent and in optical communication with the at least one photonic device of the OE-IC.

* * * * *